United States Patent
Takara et al.

(10) Patent No.: US 11,795,995 B2
(45) Date of Patent: Oct. 24, 2023

(54) JOURNAL BEARING AND ROTATING MACHINE

(71) Applicant: Mitsubishi Electric Corporation, Tokyo (JP)

(72) Inventors: Naokatsu Takara, Tokyo (JP); Yosuke Uchida, Tokyo (JP); Saya Okano, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 50 days.

(21) Appl. No.: 17/628,565

(22) PCT Filed: Nov. 5, 2019

(86) PCT No.: PCT/JP2019/043253
§ 371 (c)(1),
(2) Date: Jan. 20, 2022

(87) PCT Pub. No.: WO2021/090360
PCT Pub. Date: May 14, 2021

(65) Prior Publication Data
US 2022/0260113 A1 Aug. 18, 2022

(51) Int. Cl.
*F16C 17/03* (2006.01)
*F16C 33/10* (2006.01)

(52) U.S. Cl.
CPC ............ *F16C 17/03* (2013.01); *F16C 33/108* (2013.01); *F16C 33/1045* (2013.01); *F16C 33/1065* (2013.01)

(58) Field of Classification Search
CPC ...... F16C 17/028; F16C 17/03; F16C 17/035; F16C 33/103; F16C 33/1045; F16C 33/1065; F16C 33/1075; F16C 33/108
See application file for complete search history.

(56) References Cited

U.S. PATENT DOCUMENTS 4,568,204 A * 2/1986 Chambers ........... F16C 33/1045
384/152
5,702,186 A 12/1997 Hackstie et al.
(Continued)

FOREIGN PATENT DOCUMENTS

EP 2762735 A1 8/2014
JP 61-7616 U 1/1986
(Continued)

OTHER PUBLICATIONS

International Search Report and Written Opinion dated Jan. 7, 2020, received for PCT Application PCT/JP2019/04325, Filed on Nov. 5, 2019, 11 pages including English Translation.
(Continued)

*Primary Examiner* — James Pilkington
(74) *Attorney, Agent, or Firm* — XSENSUS LLP

(57) ABSTRACT

Provided is a journal bearing, including: a carrier ring; a pad; and an oil supply nozzle configured to supply oil to a portion between a rotation shaft and the pad. The pad includes: an inner peripheral surface opposed to the rotation shaft; and an upstream end surface located on an upstream side of the inner peripheral surface in a rotating direction of the rotation shaft. The inner peripheral surface includes a partially cylindrical surface, and a recessed portion, which is arranged on an upstream side of the partially cylindrical surface, and forms an opening space for storing the oil. The opening space includes: an oil inlet port opened at the upstream end surface; and an oil outlet port opened toward the rotation shaft. The pad includes a backflow preventing portion configured to prevent the oil in the opening space from flowing back to the oil inlet port.

15 Claims, 14 Drawing Sheets

(56) References Cited

U.S. PATENT DOCUMENTS

| | | | |
|---|---|---|---|
| 10,274,010 B2* | 4/2019 | Kawashima | ......... F16C 17/022 |
| 10,962,051 B2* | 3/2021 | Yokoyama | ............. F16C 17/03 |
| 2005/0175263 A1 | 8/2005 | Nanbu et al. | |
| 2013/0330030 A1 | 12/2013 | Suzuki et al. | |
| 2014/0205224 A1 | 7/2014 | Hemmi et al. | |
| 2021/0285486 A1 | 9/2021 | Hagiya et al. | |

FOREIGN PATENT DOCUMENTS

| | | | |
|---|---|---|---|
| JP | 2000-274432 A | 10/2000 | |
| JP | 2001-200847 A | 7/2001 | |
| JP | 2008-151239 A | 7/2008 | |
| JP | 2018-105467 A | 7/2018 | |
| WO | 2013/046404 A1 | 4/2013 | |

OTHER PUBLICATIONS

Office Action dated Mar. 31, 2023, in Chinese Patent Application No. 201980100498.X with English translation thereof, 17 pages.

German Office Action dated May 8, 2023 in corresponding German Patent Application No. 11 2019 007 871.2 (with English translation), 11 pages.

* cited by examiner

JOURNAL BEARING AND ROTATING MACHINE

CROSS-REFERENCE TO RELATED APPLICATION

The present application is based on PCT filing PCT/JP2019/043253, filed Nov. 5, 2019, the entire contents of which are incorporated herein by reference.

TECHNICAL FIELD

The present invention relates to a journal bearing including a pad, and a rotating machine including the journal bearing.

BACKGROUND ART

In Patent Literature 1, a pad-type journal bearing using a direct lubrication system is described. The journal bearing includes a plurality of pads and an oil supply nozzle. The plurality of pads are swingably provided in a bearing inner ring, and are configured to support a journal such that the journal can self-align. The oil supply nozzle is provided on a front side of each pad in a rotating direction of the journal, and is configured to supply lubricating oil to a bearing surface of the pad. A chamfered portion inclined toward the bearing surface of the pad is formed on at least a center portion of a front edge portion of the pad. In Patent Literature 1, there is a description that the chamfered portion is provided to increase the sectional area of an inlet portion for the lubricating oil, thereby reducing non-effective lubricating oil that is not supplied to the pad.

CITATION LIST

Patent Literature

[PTL 1] JP 2000-274432 A

SUMMARY OF INVENTION

Technical Problem

However, even in the journal bearing as described above, there is a problem in that the oil cannot be efficiently supplied to an inner peripheral surface of the pad in some cases.

The present invention has been made in view of the problem as described above, and has an object to provide a journal bearing and a rotating machine capable of efficiently supplying oil to an inner peripheral surface of a pad.

According to the present invention, there is provided a journal bearing, including: a carrier ring to be arranged on an outer peripheral side of a rotation shaft; a pad to be arranged on the outer peripheral side of the rotation shaft and an inner peripheral side of the carrier ring; and an oil supply nozzle configured to supply oil to a portion between the rotation shaft and the pad, wherein the pad includes: an inner peripheral surface opposed to the rotation shaft; and an upstream end surface located on an upstream side of the inner peripheral surface in a rotating direction of the rotation shaft, wherein the inner peripheral surface includes: a partially cylindrical surface; and a recessed portion which is arranged on an upstream side of the partially cylindrical surface, and forms an opening space for storing the oil, wherein the opening space includes: an oil inlet port opened at the upstream end surface; and an oil outlet port opened toward the rotation shaft, and wherein the pad includes a backflow preventing portion configured to prevent the oil in the opening space from flowing back to the oil inlet port.

According to the present invention, there is provided a rotating machine, including: the journal bearing according to the present invention; and the rotation shaft.

Advantageous Effects of Invention

According to the present invention, the journal bearing and the rotating machine capable of efficiently supplying oil to the inner peripheral surface of the pad can be obtained.

DESCRIPTION OF EMBODIMENTS

First Embodiment

Figure 1:
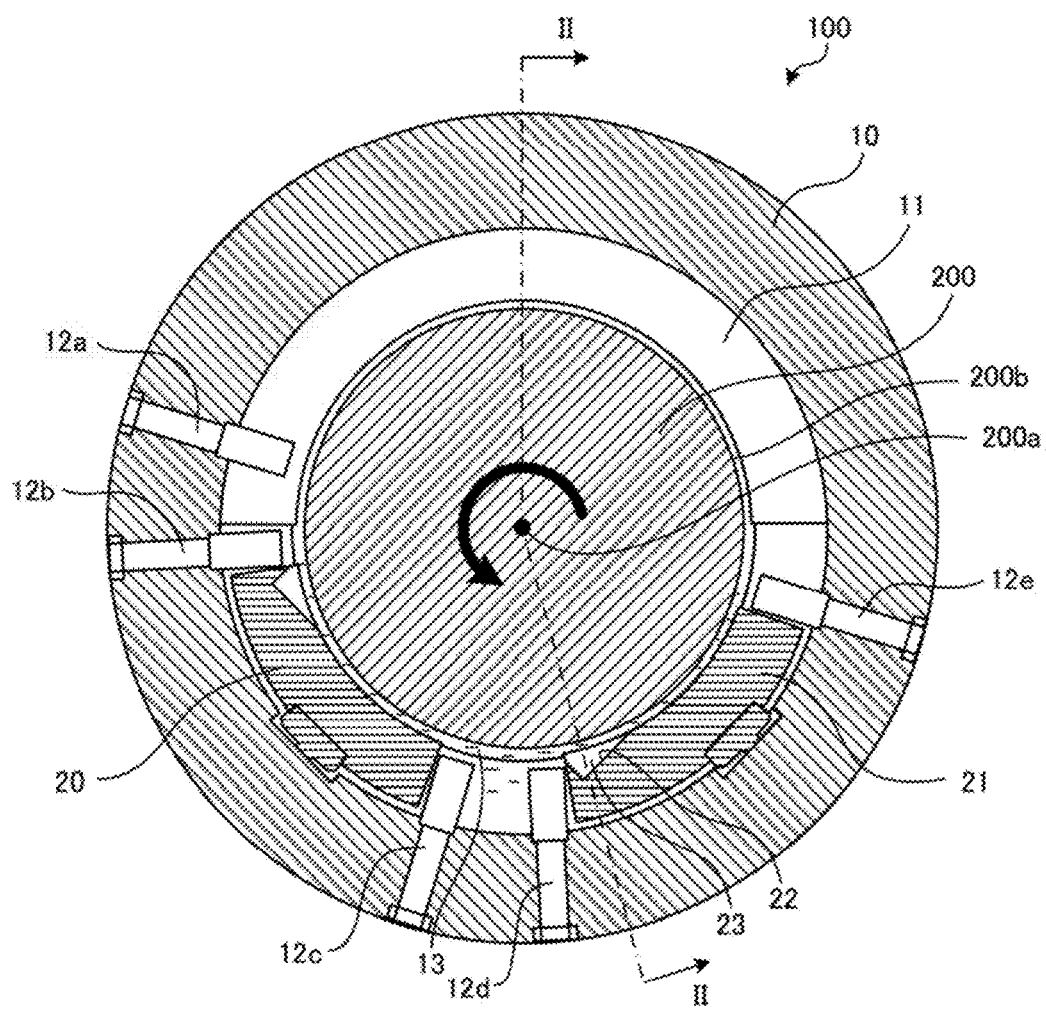
FIG. 1 is a sectional view for illustrating a configuration of a journal bearing according to a first embodiment.
Figure 2:
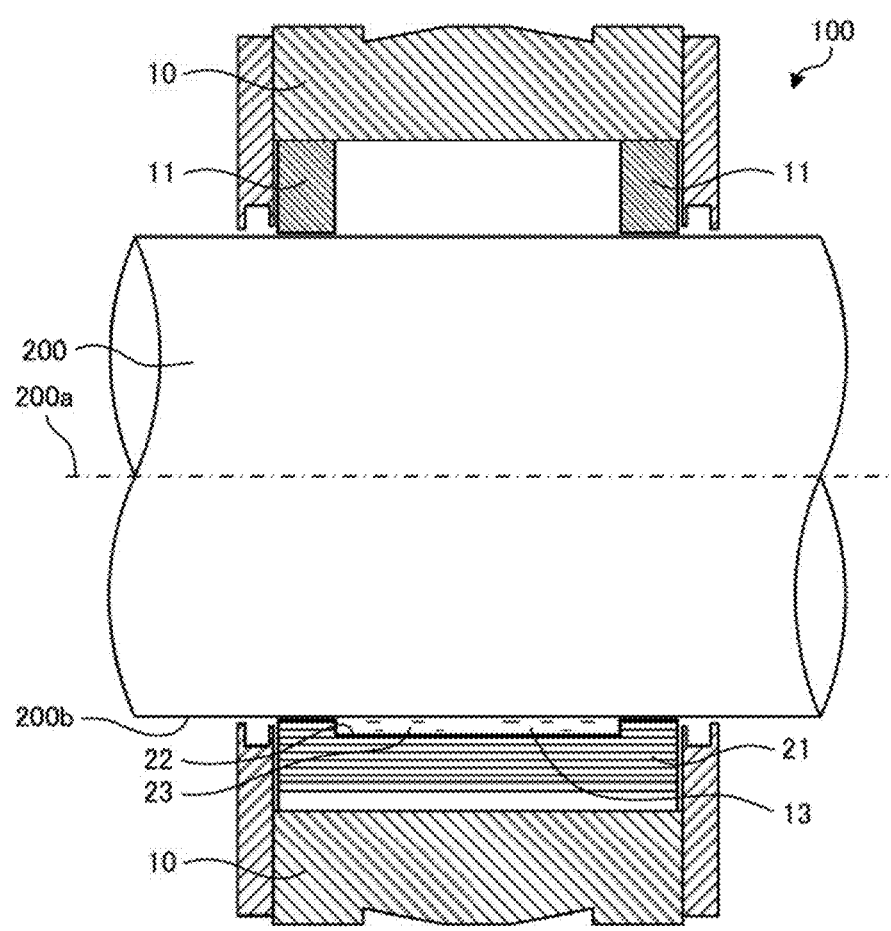
FIG. 2 is a sectional view for illustrating a cross section taken along the line II-II of FIG. 1.

A journal bearing according to a first embodiment is described. The journal bearing according to this embodiment is a sliding bearing configured to rotatably support a rotation shaft. The journal bearing according to this embodiment can be applied to various rotating machines such as a rotating electric machine. FIG. 1 is a sectional view for illustrating a configuration of a journal bearing 100 according to this embodiment. FIG. 1 is an illustration of a cross section of the journal bearing 100 and a rotation shaft 200 taken along a plane perpendicular to an axial center 200a of the rotation shaft 200. FIG. 2 is a sectional view for illustrating a cross section taken along the line II-II of FIG. 1. An up-and-down direction in FIG. 1 and FIG. 2 represents, for example, a vertical up-and-down direction. In FIG. 1 and FIG. 3 to FIG. 24 referred to below, a rotating direction of the rotation shaft 200 is indicated by a thick arrow.

As illustrated in FIG. 1 and FIG. 2, the journal bearing 100 has an annular shape as a whole. The rotation shaft 200 is inserted into the journal bearing 100. The journal bearing 100 is configured to rotatably support the rotation shaft 200. The rotating direction of the rotation shaft 200 is a counterclockwise direction in FIG. 1. The axial center 200a of the rotation shaft 200 extends in a horizontal direction. In the following description, a direction parallel to the axial center 200a of the rotation shaft 200 may be referred to as an axial direction. Further, a radial direction around the axial center 200a may be simply referred to as a radial direction. A circumferential direction around the axial center 200a may be simply referred to as a circumferential direction.

The journal bearing 100 includes a carrier ring 10 and two pads 20 and 21. The carrier ring 10 is arranged on an outer peripheral side of the rotation shaft 200. The pads 20 and 21 are arranged on the outer peripheral side of the rotation shaft 200 and an inner peripheral side of the carrier ring 10, and are configured to receive a load of the rotation shaft 200. The pad 20 and the pad 21 are provided between a lower half portion of an outer peripheral surface 200b of the rotation shaft 200 and a lower half portion of an inner peripheral surface of the carrier ring 10. The pad 20 and the pad 21 are provided at circumferential positions different from each other along the outer peripheral surface 200b of the rotation shaft 200. The pad 21 is arranged in front of the pad 20 at an interval in the rotating direction of the rotation shaft 200.

In this embodiment, each of the pad 20 and the pad 21 can be inclined with respect to the outer peripheral surface 200b of the rotation shaft 200. The journal bearing 100 including the pad 20 and the pad 21 as described above is called a tilting pad journal bearing.

A pair of semicircular guide metals 11 are provided between an upper half portion of the outer peripheral surface 200b of the rotation shaft 200 and an upper half portion of the inner peripheral surface of the carrier ring 10. The pair of guide metals 11 have a function of preventing bounce of the rotation shaft 200.

The journal bearing 100 includes five oil supply nozzles 12a, 12b, 12c, 12d, and 12e configured to supply oil 13 to a portion between the rotation shaft 200 and each of the pad 20 and the pad 21. The five oil supply nozzles 12a, 12b, 12c, 12d, and 12e are provided at circumferential positions different from each other along the outer peripheral surface 200b of the rotation shaft 200. When the rotation shaft 200 is rotated, the oil 13 supplied from each of the oil supply nozzles 12a, 12b, 12c, 12d, and 12e flows in the same direction as the rotating direction of the rotation shaft 200 along with a shear force due to rotation of the rotation shaft 200. That is, the flow direction of the oil 13 in the journal bearing 100 is the same direction as the rotating direction of the rotation shaft 200.

In the following description, a rear side in the rotating direction of the rotation shaft 200 may be referred to as an upstream side in the rotating direction of the rotation shaft 200 or simply referred to as an upstream side. Further, a front side in the rotating direction of the rotation shaft 200 may be referred to as a downstream side in the rotating direction of the rotation shaft 200 or simply referred to as a downstream side.

The oil supply nozzle 12a is arranged on an upstream side of the pad 20. The oil supply nozzle 12b is arranged on a downstream side of the oil supply nozzle 12a and the upstream side of the pad 20. The oil supply nozzle 12c is arranged on a downstream side of the pad 20 and an upstream side of the pad 21. The oil supply nozzle 12d is arranged on a downstream side of the oil supply nozzle 12c and the upstream side of the pad 21. The oil supply nozzle 12e is arranged on a downstream side of the pad 21.

Figure 3:
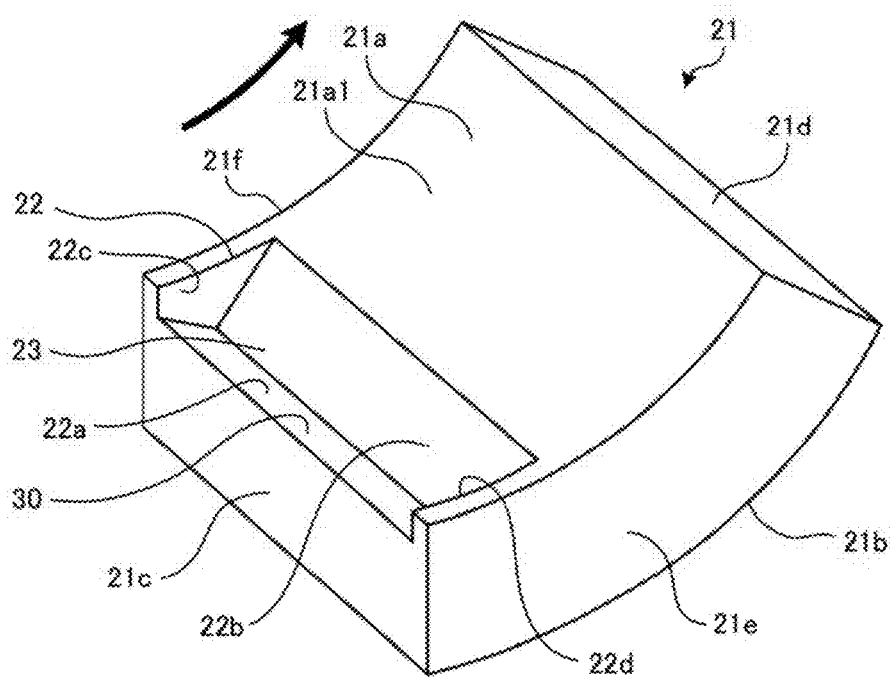
FIG. 3 is a perspective view for illustrating a configuration of a pad of the journal bearing according to the first embodiment.

Next, configurations of the pad 20 and the pad 21 are described. The pad 20 and the pad 21 have the same configuration, and hence the pad 21 is described as an example here. FIG. 3 is a perspective view for illustrating the configuration of the pad 21 of the journal bearing 100 according to this embodiment. As illustrated in FIG. 3, the pad 21 has a partially cylindrical shape as a whole. The pad 21 includes an inner peripheral surface 21a and an outer peripheral surface 21b. The inner peripheral surface 21a of the pad 21 is arranged so as to be opposed to the outer peripheral surface 200b of the rotation shaft 200. The outer peripheral surface 21b of the pad 21 is arranged so as to be opposed to the inner peripheral surface of the carrier ring 10.

Further, the pad 21 includes an upstream end surface 21c and a downstream end surface 21d. The upstream end surface 21c is an end surface formed on an upstream side of the inner peripheral surface 21a and the outer peripheral surface 21b in the rotating direction of the rotation shaft 200. The downstream end surface 21d is an end surface formed on a downstream side of the inner peripheral surface 21a and the outer peripheral surface 21b in the rotating direction of the rotation shaft 200. Further, the pad 21 includes a side end surface 21e and a side end surface 21f. Both the side end surface 21e and the side end surface 21f are end surfaces formed perpendicularly to the axial direction.

The inner peripheral surface 21a of the pad 21 includes a partially cylindrical surface 21a1, and a recessed portion 22 arranged on an upstream side of the partially cylindrical surface 21a1. The partially cylindrical surface 21a1 is arranged along the outer peripheral surface 200b of the rotation shaft 200 via a gap. The recessed portion 22 has an opening space 23 for storing oil.

Figure 4:
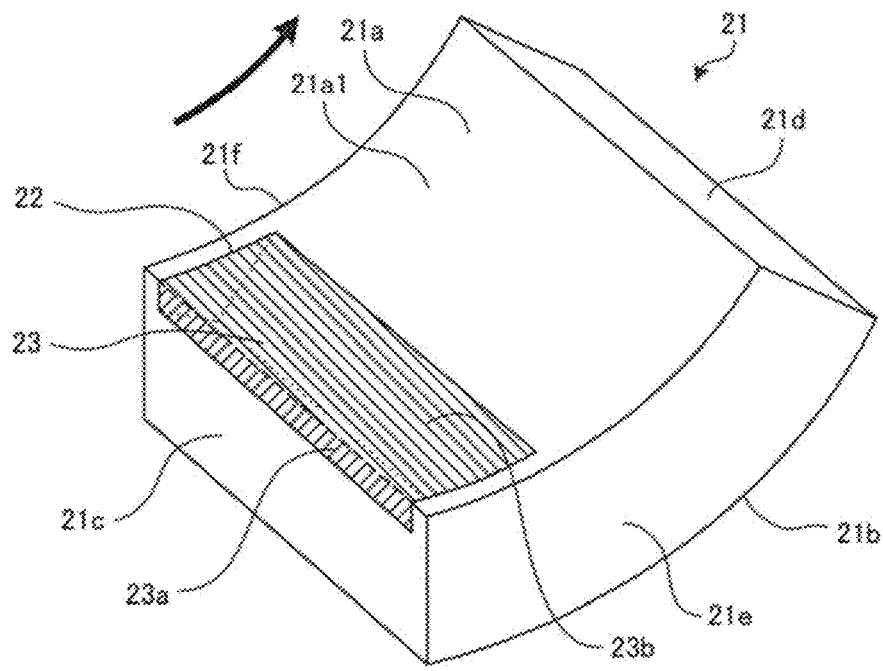
FIG. 4 is a perspective view for illustrating a configuration of an opening space formed in the pad of the journal bearing according to the first embodiment.

FIG. 4 is a perspective view for illustrating a configuration of the opening space 23 formed in the pad 21 of the journal bearing 100 according to this embodiment. As illustrated in FIG. 4, the opening space 23 has an oil inlet port 23a and an oil outlet port 23b. The oil inlet port 23a is opened at the upstream end surface 21c. The oil outlet port 23b is opened toward the rotation shaft 200. In FIG. 4, the oil inlet port 23a is indicated by right upward hatching, and the oil outlet port 23b is indicated by right downward hatching. The oil inlet port 23a and the oil outlet port 23b are connected so as to allow fluid to flow therethrough via the opening space 23.

The oil that flows along with rotation of the rotation shaft 200 is introduced to the opening space 23 via the oil inlet port 23a and is stored in the opening space 23. The oil in the opening space 23 is led out from the opening space 23 via the oil outlet port 23b and is supplied to the gap between the partially cylindrical surface 21a1 of the pad 21 and the outer peripheral surface 200b of the rotation shaft 200. As a result, an oil film is formed between the partially cylindrical surface 21a1 of the pad 21 and the outer peripheral surface 200b of the rotation shaft 200. A radial load of the rotation shaft 200 including the own weight of the rotation shaft 200 is supported on the pad 21 in a non-contact manner by an oil film pressure between the partially cylindrical surface 21a1 and the outer peripheral surface 200b.

Referring back to FIG. 3, the recessed portion 22 includes, as a bottom surface that defines an outer peripheral side of the opening space 23, at least a first bottom surface 22a, and a second bottom surface 22b arranged on a downstream side of the first bottom surface 22a and inclined with respect to the first bottom surface 22a. Both the first bottom surface 22a and the second bottom surface 22b are located on an outer peripheral side with respect to the opening space 23.

The first bottom surface 22a is inclined such that a radial distance between the first bottom surface 22a and the outer peripheral surface 200b of the rotation shaft 200 increases toward the downstream side. That is, the first bottom surface 22a is inclined such that the radial distance between the first bottom surface 22a and the outer peripheral surface 200b decreases toward the upstream side. An end portion of the first bottom surface 22a on the upstream side is connected to the upstream end surface 21c and defines an outer peripheral side of the oil inlet port 23a. The first bottom surface 22a is formed in, for example, a planar shape. As described later, the first bottom surface 22a functions as a backflow preventing portion 30 that prevents the oil in the opening space 23 from flowing back to the oil inlet port 23a.

The second bottom surface 22b is inclined such that a radial distance between the second bottom surface 22b and the outer peripheral surface 200b of the rotation shaft 200 decreases toward the downstream side. That is, the second bottom surface 22b is inclined such that the radial distance between the second bottom surface 22b and the outer peripheral surface 200b increases toward the upstream side. An end portion of the second bottom surface 22b on the upstream side is connected to an end portion of the first bottom surface 22a on the downstream side. An end portion of the second bottom surface 22b on the downstream side is connected to the partially cylindrical surface 21a1. The second bottom surface 22b is formed in, for example, a planar shape.

Further, the recessed portion 22 includes a first side surface 22c and a second side surface 22d. The first side surface 22c defines one axial end side of the opening space 23. An end portion of the first side surface 22c on the upstream side is connected to the upstream end surface 21c, and defines one axial end side of the oil inlet port 23a. The second side surface 22d defines the other axial end side of the opening space 23. An end portion of the second side surface 22d on the upstream side is connected to the upstream end surface 21c, and defines the other axial end side of the oil inlet port 23a. Both the first side surface 22c and the second side surface 22d are formed in a planar shape perpendicular to the axial direction.

Figure 5:
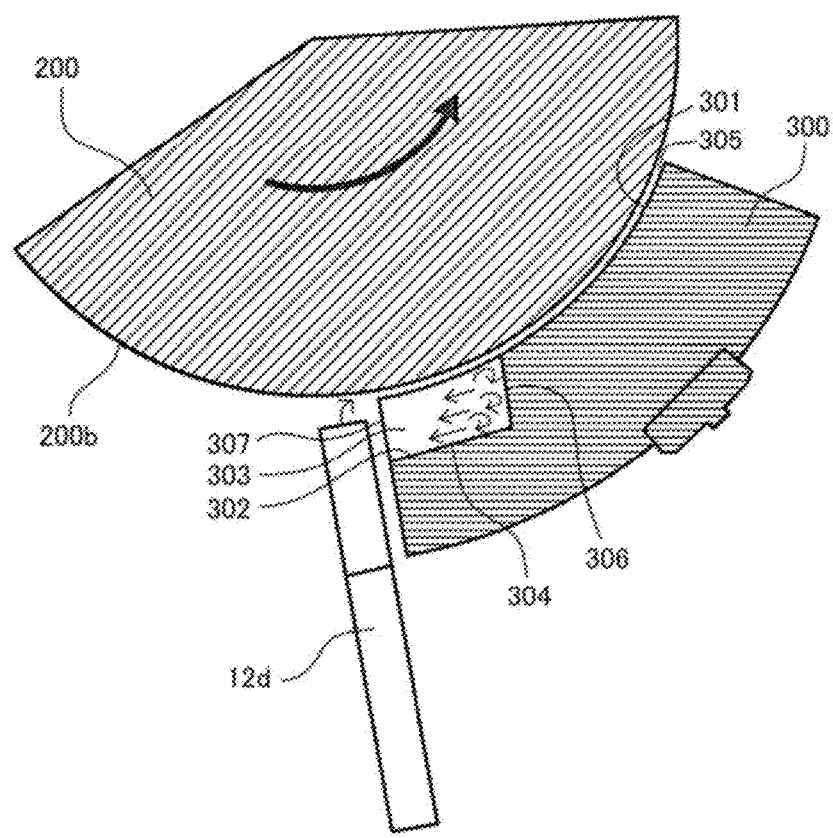
FIG. 5 is a sectional view for illustrating a partial configuration of a journal bearing according to a comparative example of the first embodiment.
Figure 6:
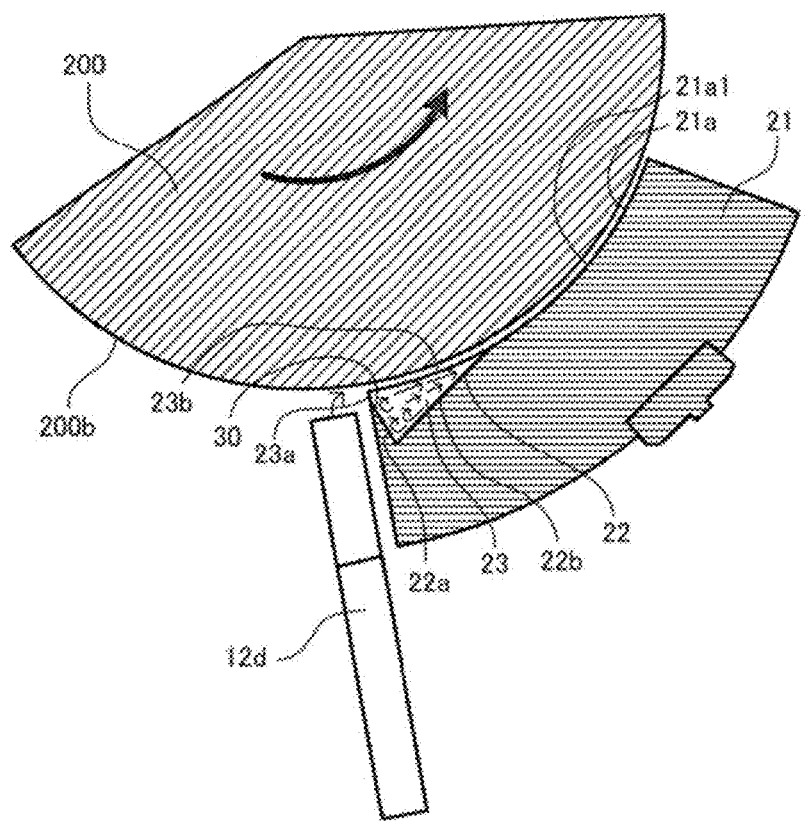
FIG. 6 is a sectional view for illustrating a partial configuration of the journal bearing according to the first embodiment.

Next, actions of the backflow preventing portion 30 in this embodiment are described in comparison with a comparative example. FIG. 5 is a sectional view for illustrating a partial configuration of a journal bearing according to a comparative example of this embodiment. FIG. 6 is a sectional view for illustrating a partial configuration of the journal bearing 100 according to this embodiment. In FIG. 5 and FIG. 6, cross sections of the journal bearing and the rotation shaft taken along a plane perpendicular to the axial direction are illustrated. Further, in FIG. 5 and FIG. 6, an example of the flow of the oil is indicated by the arrows.

Similarly to the pad 21 in this embodiment illustrated in FIG. 6, a recessed portion 302 forming an opening space 303 is formed in an inner peripheral surface 301 of a pad 300 in the comparative example illustrated in FIG. 5. However, a bottom surface 304 of the recessed portion 302 in the comparative example is formed substantially flat along the inner peripheral surface 301. That is, a radial distance between the bottom surface 304 and the outer peripheral surface 200b of the rotation shaft 200 does not necessarily decrease toward the upstream side.

In general, a thickness of an oil film formed in a gap 305 between the outer peripheral surface 200b of the rotation shaft 200 and the inner peripheral surface 301 of the pad 300 is extremely thin. For example, the thickness of the oil film formed in the gap 305 is several μm in a case of a small-sized journal bearing, and is several hundreds μm or less even in a case of a large-sized journal bearing. On the other hand, in order to store the oil in the opening space 303 in the pad 300 in the comparative example, it is required to set a depth of the opening space 303 in the radial direction to several mm or more. Thus, an inclination angle of a wall surface 306 connecting the inner peripheral surface 301 and the bottom surface 304 to each other with respect to the inner peripheral surface 301 increases.

In such a configuration, the oil flowing into the opening space 303 from an oil inlet port 307 is rebounded at the wall surface 306 as indicated by the arrows in FIG. 5, and flows back toward the oil inlet port 307. In the configuration of the comparative example, the backflow preventing portion is not provided, and hence the oil in the opening space 303 cannot be prevented from flowing back to the oil inlet port 307. As a result, even when the oil once flows into the opening space 303 from the oil inlet port 307, the inflow oil may flow back to the oil inlet port 307 to flow out from the oil inlet port 307 to an outside of the opening space 303. Thus, even when the pad 300 has a structure in which the oil can easily flow into the opening space 303, the oil cannot be efficiently supplied to the inner peripheral surface 301 of the pad 300 in some cases.

In contrast, the first bottom surface 22a that functions as the backflow preventing portion 30 is formed in the recessed portion 22 of the pad 21 in this embodiment illustrated in FIG. 6. The first bottom surface 22a is inclined such that the radial distance between the first bottom surface 22a and the outer peripheral surface 200b of the rotation shaft 200 decreases toward the upstream side. Thus, the sectional area of the opening space 23 is reduced toward the upstream side. That is, the opening space 23 has a shape that becomes narrower toward the upstream side. Thus, when the oil in the opening space 23 flows back to the upstream side, that is, the oil inlet port 23a side, the flow path of the backflow oil becomes narrower in the flow direction, and hence a high pressure loss is generated so that the flow rate of the backflow oil decreases. As a result, the oil in the opening space 23 is prevented from flowing back to the oil inlet port 23a.

The backflow preventing portion 30 in this embodiment is configured to prevent the backflow of the oil with an action of a pressure loss generated in the backflow oil, but is not limited thereto. The backflow preventing portion 30 may be configured to suppress the backflow using, for example, a method of bringing the direction of the velocity vector of the backflow oil closer to the rotating direction of the rotation shaft 200 with an action such as rebound at the wall surface or a method of reducing the flow velocity of the backflow oil with an action such as transition from a laminar flow to a turbulent flow.

In this embodiment, the oil in the opening space 23 is prevented from flowing back to the oil inlet port 23a, thereby being capable of efficiently supplying the oil in the opening space 23 from the oil outlet port 23b to the partially cylindrical surface 21a1 of the pad 21. As a result, an oil film having a sufficient thickness can be formed between the partially cylindrical surface 21a1 of the pad 21 and the outer peripheral surface 200b of the rotation shaft 200. Thus, according to this embodiment, abnormal vibration caused by insufficient oil film pressure can be prevented.

A friction loss generated by friction between the rotation shaft and the oil is classified into an oil film loss which is a friction loss due to shearing of an oil film portion and an agitation loss which is a friction loss due to agitation of the oil stored in a region other than the oil film portion. When a loss generated in the journal bearing with respect to energy of the rotation shaft is defined as a bearing loss, the bearing loss is substantially equal to the sum of the oil film loss and the agitation loss. In general, the oil film loss is proportional to the area of the inner peripheral surface of the pad, and the agitation loss is proportional to the amount of oil supply.

In this embodiment, the oil in the opening space 23 can be efficiently supplied to the partially cylindrical surface 21a1 of the pad 21, thereby being capable of reducing the amount of oil supply to the opening space 23. Thus, according to this embodiment, the agitation loss can be reduced, and, accordingly, the bearing loss of the journal bearing 100 can be reduced.

In the configuration illustrated in FIG. 1 and FIG. 6, oil supply directions of the oil supply nozzles 12a, 12b, 12c, 12d, and 12e are all a direction toward the axial center 200a of the rotation shaft 200. However, at least the oil supply directions of the oil supply nozzles arranged on the respective upstream sides of the pad 20 and the pad 21 may be a direction toward the oil inlet port 23a. For example, the oil supply direction of the oil supply nozzle 12b arranged on the upstream side of the pad 20 may be a direction toward the oil inlet port 23a of the pad 20. Further, the oil supply direction of the oil supply nozzle 12d arranged on the upstream side of the pad 21 may be a direction toward the oil inlet port 23a of the pad 21. As a result, the oil can be supplied toward the oil inlet port 23a of the pad 20 and the pad 21, thereby being capable of efficiently storing the oil in the opening space 23.

As described above, the journal bearing 100 according to this embodiment includes: the carrier ring 10 to be arranged on the outer peripheral side of the rotation shaft 200; the pad 21 to be arranged on the outer peripheral side of the rotation shaft 200 and the inner peripheral side of the carrier ring 10; and the oil supply nozzle 12d configured to supply oil to the portion between the rotation shaft 200 and the pad 21. The pad 21 includes: the inner peripheral surface 21a opposed to the rotation shaft 200; and the upstream end surface 21c located on the upstream side of the inner peripheral surface 21a in the rotating direction of the rotation shaft 200. The inner peripheral surface 21a includes: the partially cylindrical surface 21a1; and the recessed portion 22 which is arranged on the upstream side of the partially cylindrical surface 21a1, and forms the opening space 23 for storing the oil. The opening space 23 includes: the oil inlet port 23a opened at the upstream end surface 21c; and the oil outlet port 23b opened toward the rotation shaft 200. The pad 21 includes the backflow preventing portion 30 configured to prevent the oil in the opening space 23 from flowing back to the oil inlet port 23a.

According to this configuration, the oil in the opening space 23 can be prevented from flowing back to the oil inlet port 23a, thereby being capable of efficiently supplying the oil in the opening space 23 to the partially cylindrical surface 21a1 of the pad 21. Thus, abnormal vibration due to insufficient oil film pressure can be prevented. Further, according to this configuration, the amount of oil supply to the opening space 23 can be reduced, thereby being capable of reducing the agitation loss. Thus, the bearing loss of the journal bearing 100 can be reduced.

In the journal bearing 100 according to this embodiment, the backflow preventing portion 30 includes the first bottom surface 22a that defines the outer peripheral side of the opening space 23. The radial distance between the first bottom surface 22a and the rotation shaft 200 decreases toward the upstream side. Here, the first bottom surface 22a is an example of the bottom surface.

According to this configuration, the sectional area of the opening space 23 is reduced toward the upstream side. Thus, a high pressure loss is generated in the oil that flows back in the opening space 23, and the flow rate of the backflow oil decreases. As a result, the oil in the opening space 23 can be prevented from flowing back to the oil inlet port 23a.

Second Embodiment

Figure 7:
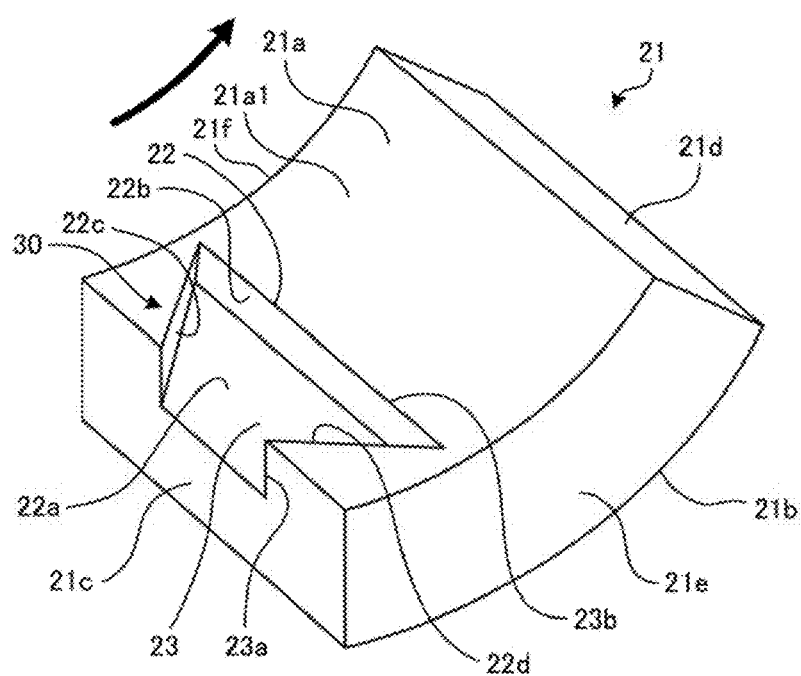
FIG. 7 is a perspective view for illustrating a configuration of a pad of a journal bearing according to a second embodiment.

A journal bearing according to a second embodiment is described. FIG. 7 is a perspective view for illustrating a configuration of a pad 21 of the journal bearing 100 according to this embodiment. Description of the same configurations as those of the first embodiment is omitted.

As illustrated in FIG. 7, the recessed portion 22 formed in the pad 21 in this embodiment includes, as a bottom surface that defines the outer peripheral side of the opening space 23, at least the first bottom surface 22a, and the second bottom surface 22b arranged on the downstream side of the first bottom surface 22a. In this embodiment, the radial distance between the first bottom surface 22a and the outer peripheral surface 200b of the rotation shaft 200 does not necessarily decrease toward the upstream side. The second bottom surface 22b is inclined such that the radial distance between the second bottom surface 22b and the outer peripheral surface 200b of the rotation shaft 200 decreases toward the downstream side.

Further, the recessed portion 22 includes the first side surface 22c that defines the one axial end side of the opening space 23, and the second side surface 22d that defines the other axial end side of the opening space 23. An axial distance between the first side surface 22c and the second side surface 22d decreases toward the upstream side. As a result, the sectional area of the opening space 23 is reduced toward the upstream side. That is, the opening space 23 has a shape that becomes narrower toward the upstream side. In this embodiment, the first side surface 22c and the second side surface 22d function as the backflow preventing portion 30.

Here, in this embodiment, both the first side surface 22c and the second side surface 22d are inclined with respect to a plane perpendicular to the axial direction. However, one of the first side surface 22c and the second side surface 22d may be perpendicular to the axial direction.

As described above, in the journal bearing 100 according to this embodiment, the backflow preventing portion 30 includes the first side surface 22c that defines the one axial end side of the opening space 23, and the second side surface 22d that defines the other axial end side of the opening space 23. The axial distance between the first side surface 22c and the second side surface 22d decreases toward the upstream side.

According to this configuration, the sectional area of the opening space 23 is reduced toward the upstream side. Thus, a high pressure loss is generated in the oil that flows back in the opening space 23, and the flow rate of the backflow oil decreases. As a result, similarly to the first embodiment, the oil in the opening space 23 can be prevented from flowing back to the oil inlet port 23a. Thus, the oil in the opening space 23 can be efficiently supplied to the partially cylindrical surface 21a1 of the pad 21.

Third Embodiment

Figure 8:
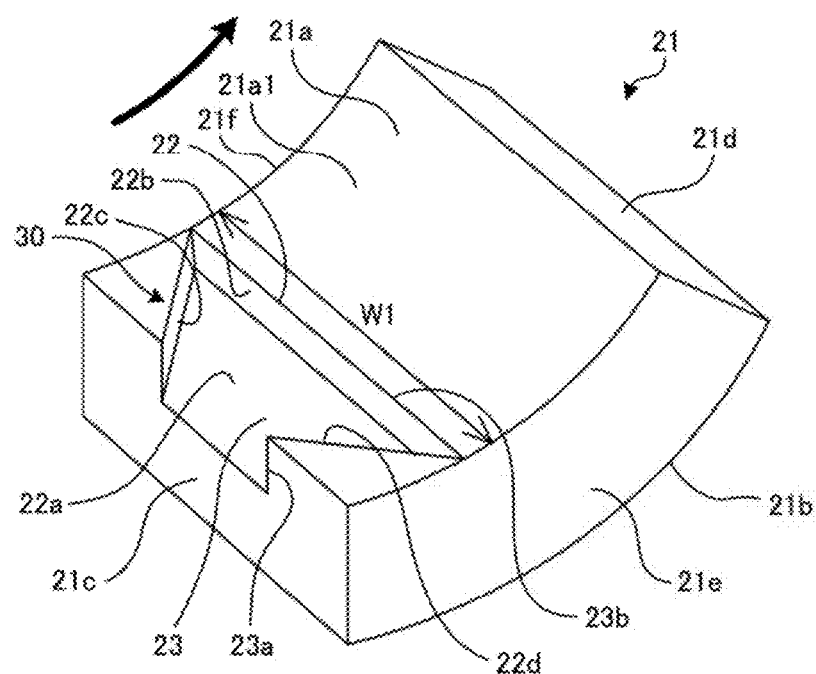
FIG. 8 is a perspective view for illustrating a configuration of a pad of a journal bearing according to a third embodiment.

A journal bearing according to a third embodiment is described. FIG. 8 is a perspective view for illustrating a configuration of a pad 21 of the journal bearing 100 according to this embodiment. This embodiment is different from the second embodiment in a relationship between the axial distance between the first side surface 22c and the second side surface 22d and an axial dimension of the inner peripheral surface 21a of the pad 21. The point that the first side surface 22c and the second side surface 22d function as the backflow preventing portion 30 is the same as the second embodiment. Description of the same configurations as those of the first or second embodiment is omitted.

In the configuration of the second embodiment illustrated in FIG. 7, the axial distance between the first side surface 22c and the second side surface 22d increases toward the downstream side, but does not reach the axial dimension of the inner peripheral surface 21a of the pad 21. In contrast, in the configuration of this embodiment illustrated in FIG. 8, the axial distance between the first side surface 22c and the second side surface 22d increases toward the downstream side, and reaches an axial dimension W1 of the partially cylindrical surface 21a1. That is, in this embodiment, a maximum value of the axial distance between the first side surface 22c and the second side surface 22d is substantially equal to the axial dimension W1 of the partially cylindrical surface 21a1.

Figure 9:
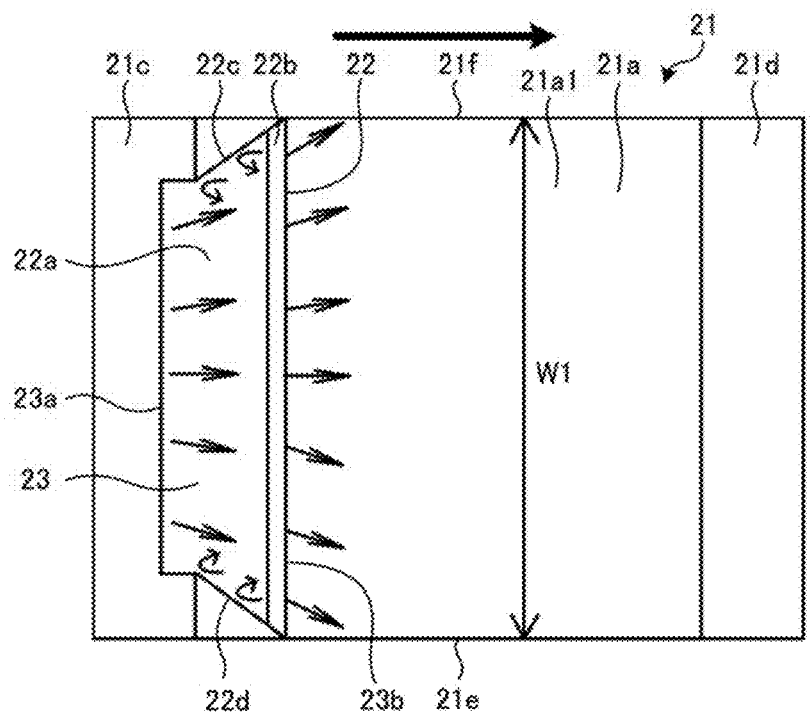
FIG. 9 is a top view for illustrating a configuration of the pad of the journal bearing according to the third embodiment as viewed from an inner peripheral side.

Effects obtained by the configuration of this embodiment are described with reference to FIG. 9. FIG. 9 is a top view for illustrating a configuration of the pad 21 of the journal bearing 100 according to this embodiment as viewed from the inner peripheral side. An up-and-down direction in FIG. 9 represents the axial direction. In FIG. 9, an example of the flow of the oil is indicated by the arrows.

As illustrated in FIG. 9, an axial dimension of the opening space 23 increases toward the downstream side, and reaches the axial dimension W1 of the partially cylindrical surface 21a1. Thus, the oil that flows into the opening space 23 from the oil inlet port 23a spreads in the axial direction toward the downstream side, and is supplied to the entirety of the partially cylindrical surface 21a1 in the axial direction. Thus, according to this embodiment, the oil can be more reliably supplied to the entirety of the partially cylindrical surface 21a1 including both axial end portions of the partially cylindrical surface 21a1.

Further, according to this embodiment, similarly to the first and second embodiments, the oil in the opening space 23 can be prevented from flowing back to the oil inlet port 23a with the backflow preventing portion 30. Thus, the oil in the opening space 23 can be efficiently supplied to the partially cylindrical surface 21a1 of the pad 21.

As described above, in the journal bearing 100 according to this embodiment, the maximum value of the axial distance between the first side surface 22c and the second side surface 22d is equal to the axial dimension W1 of the partially cylindrical surface 21a1.

According to this configuration, the oil can be more reliably supplied to the entirety of the partially cylindrical surface 21a1 including the both axial end portions of the partially cylindrical surface 21a1.

Fourth Embodiment

Figure 10:
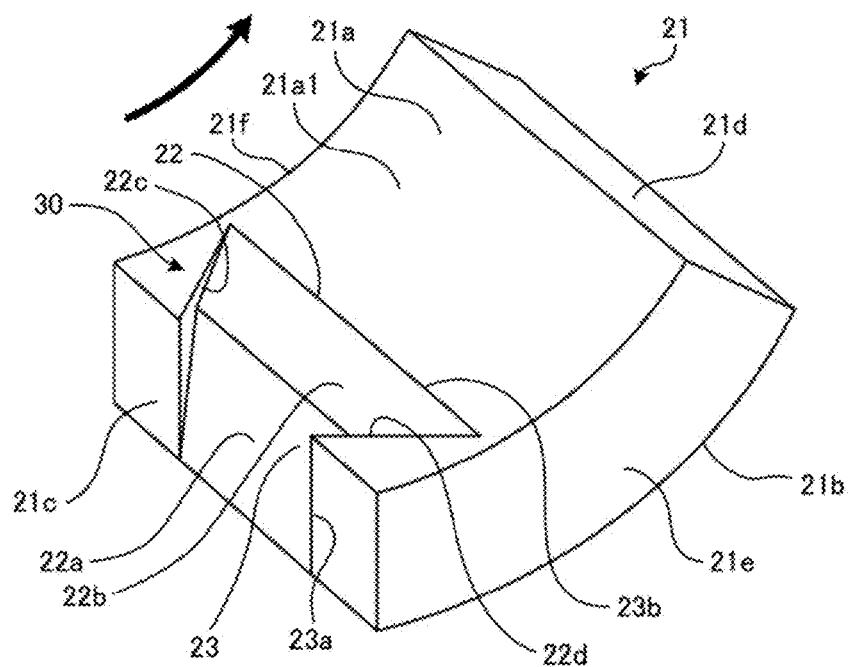
FIG. 10 is a perspective view for illustrating a configuration of a pad of a journal bearing according to a fourth embodiment.

A journal bearing according to a fourth embodiment is described. FIG. 10 is a perspective view for illustrating a configuration of a pad 21 of the journal bearing 100 according to this embodiment. This embodiment is different from the second embodiment mainly in the configurations of the first bottom surface 22a and the oil inlet port 23a. The point that the first side surface 22c and the second side surface 22d function as the backflow preventing portion 30 is the same as the second embodiment. Description of the same configurations as those of any of the first to third embodiments is omitted.

As illustrated in FIG. 10, the recessed portion 22 formed in the pad 21 in this embodiment includes, as a bottom surface that defines the outer peripheral side of the opening space 23, at least the first bottom surface 22a and the second bottom surface 22b.

The first bottom surface 22a is inclined such that a radial distance between the first bottom surface 22a and the outer peripheral surface 200b of the rotation shaft 200 decreases toward the downstream side. That is, the first bottom surface 22a is inclined such that the radial distance between the first bottom surface 22a and the outer peripheral surface 200b increases toward the upstream side. The end portion of the first bottom surface 22a on the upstream side is directly connected to an end portion of the outer peripheral surface 21b on the upstream side, and defines the outer peripheral side of the oil inlet port 23a.

Similarly to the first bottom surface 22a, the second bottom surface 22b is inclined such that the radial distance between the second bottom surface 22b and the outer peripheral surface 200b of the rotation shaft 200 increases toward the upstream side. An end portion of the second bottom surface 22b on the upstream side is connected to an end portion of the first bottom surface 22a on the downstream side. An end portion of the second bottom surface 22b on the downstream side is connected to the partially cylindrical surface 21a1. An inclination angle of the second bottom surface 22b with respect to the partially cylindrical surface 21a1 is smaller than an inclination angle of the first bottom surface 22a with respect to the partially cylindrical surface 21a1.

Figure 11:
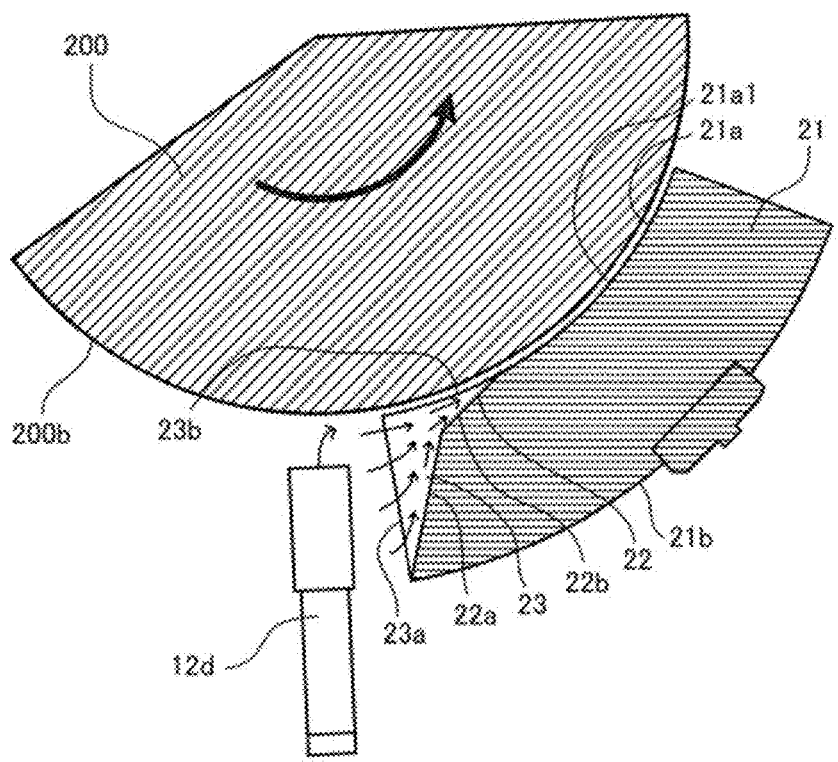
FIG. 11 is a sectional view for illustrating a partial configuration of the journal bearing according to the fourth embodiment.

Effects obtained by the configuration of this embodiment are described with reference to FIG. 11. FIG. 11 is a sectional view for illustrating a partial configuration of the journal bearing 100 according to this embodiment. FIG. 11 is an illustration of a cross section of the journal bearing 100 and the rotation shaft 200 taken along a plane perpendicular to the axial direction. In FIG. 11, an example of the flow of the oil is indicated by the arrows.

As illustrated in FIG. 11, in this embodiment, the end portion of the first bottom surface 22a on the upstream side is connected to the end portion of the outer peripheral surface 21b on the upstream side, thereby being capable of increasing a radial dimension of the oil inlet port 23a to a radial dimension of the pad 21 itself. Thus, oil on an upstream side of the pad 21 can be allowed to efficiently flow into the opening space 23 via the oil inlet port 23a.

Further, according to this embodiment, similarly to the first and second embodiments, the oil in the opening space 23 can be prevented from flowing back to the oil inlet port 23a with the backflow preventing portion 30. Thus, the oil in the opening space 23 can be efficiently supplied to the partially cylindrical surface 21a1 of the pad 21.

As described above, in the journal bearing 100 according to this embodiment, the pad 21 further includes the outer peripheral surface 21b formed on the outer peripheral side. The recessed portion 22 includes the first bottom surface 22a that defines the outer peripheral side of the opening space 23. The radial distance between the first bottom surface 22a and the rotation shaft 200 increases toward the upstream side. The end portion of the first bottom surface 22a on the upstream side is connected to the end portion of the outer peripheral surface 21b on the upstream side. Here, the first bottom surface 22a is an example of the bottom surface.

According to this configuration, the radial dimension of the oil inlet port 23a can be increased, thereby being capable of allowing the oil to efficiently flow into the opening space 23 via the oil inlet port 23a.

Fifth Embodiment

Figure 12:
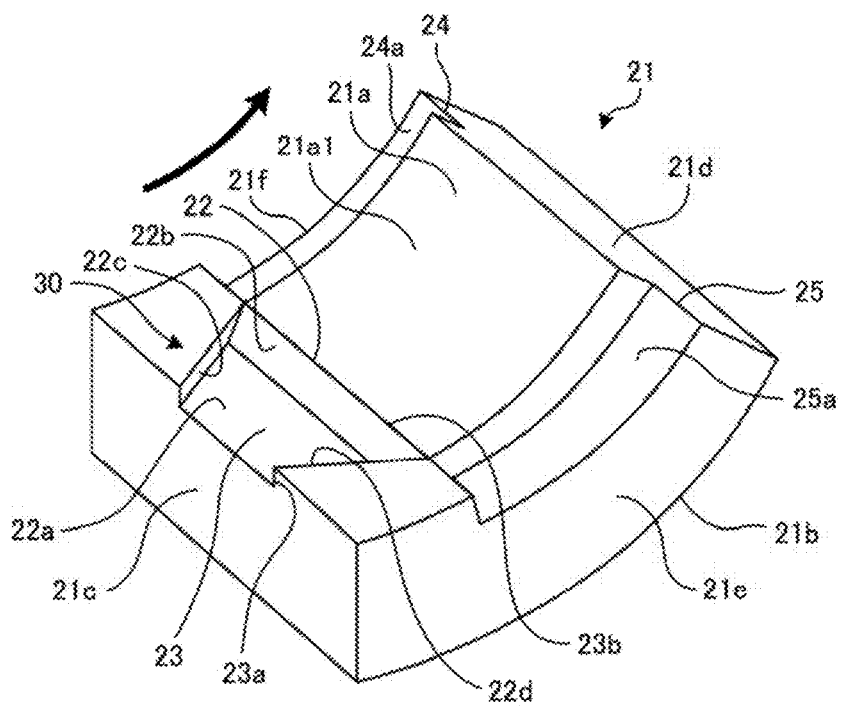
FIG. 12 is a perspective view for illustrating a configuration of a pad of a journal bearing according to a fifth embodiment.

A journal bearing according to a fifth embodiment is described. FIG. 12 is a perspective view for illustrating a configuration of a pad 21 of the journal bearing 100 according to this embodiment. This embodiment is different from the second embodiment in configurations of both axial end portions of the inner peripheral surface 21a of the pad 21. The point that the first side surface 22c and the second side surface 22d function as the backflow preventing portion 30 is the same as the second embodiment. Description of the same configurations as those of any of the first to fourth embodiments is omitted.

As illustrated in FIG. 12, a cutout portion 24 is formed in one axial end portion of the inner peripheral surface 21a of the pad 21. The cutout portion 24 is formed in an L shape in a radial cross section of the pad 21, and extends along the circumferential direction. As viewed in a direction parallel to the axial direction, the cutout portion 24 is formed in a range on the downstream side with respect to the recessed portion 22 and the opening space 23. Further, as viewed along the circumferential direction, the cutout portion 24 is formed closer to the side end surface 21f than the recessed portion 22 and the opening space 23. A radial distance between a bottom surface 24a of the cutout portion 24 and the outer peripheral surface 200b of the rotation shaft 200 is longer than a radial distance between the partially cylindrical surface 21a1 and the outer peripheral surface 200b.

Similarly, a cutout portion 25 is formed in the other axial end portion of the inner peripheral surface 21a of the pad 21. The cutout portion 25 is formed in an L shape in the radial cross section of the pad 21, and extends along the circumferential direction. As viewed in the direction parallel to the axial direction, the cutout portion 25 is formed in a range on the downstream side with respect to the recessed portion and the opening space 23. Further, as viewed along the circumferential direction, the cutout portion 25 is formed closer to the side end surface 21e than the recessed portion 22 and the opening space 23. A radial distance between a bottom surface 25a of the cutout portion 25 and the outer peripheral surface 200b of the rotation shaft 200 is longer than a radial distance between the partially cylindrical surface 21a1 and the outer peripheral surface 200b.

In this embodiment, the cutout portion 24 and the cutout portion 25 are formed in the inner peripheral surface 21a, and hence, as compared to the configuration of the second embodiment illustrated in FIG. 7, the area of the partially cylindrical surface 21a1 is smaller. An axial dimension of the partially cylindrical surface 21a1 is equal to or larger than a maximum value of the axial distance between the first side surface 22c and the second side surface 22d.

In this embodiment, a radial distance between the bottom surface 24a and the outer peripheral surface 200b of the rotation shaft 200 and a radial distance between the bottom surface 25a and the outer peripheral surface 200b are longer than the radial distance between the partially cylindrical surface 21a1 and the outer peripheral surface 200b. Thus, a shear force that acts on the oil in the cutout portion 24 and the cutout portion 25 is smaller than a shear force that acts on the oil in the partially cylindrical surface 21a1. When a radial distance between the bottom surface 24a and the outer peripheral surface 200b and the radial distance between the bottom surface 25a and the outer peripheral surface 200b are sufficiently long, an oil film pressure in the cutout portion 24 and the cutout portion 25 becomes substantially zero. As a result, in order that an oil film pressure required for supporting the rotation shaft 200 is obtained between the partially cylindrical surface 21a1 and the outer peripheral surface 200b, a thickness of the oil film formed between the partially cylindrical surface 21a1 and the outer peripheral surface 200b is reduced, and a gap between the partially cylindrical surface 21a1 and the outer peripheral surface 200b becomes narrower.

That is, according to this embodiment, the shear force that acts on the oil in the cutout portion 24 and the cutout portion 25 is reduced, thereby being capable of reducing the oil film loss. Further, according to this embodiment, a thickness of an oil film formed between the partially cylindrical surface 21a1 and the outer peripheral surface 200b of the rotation shaft 200 is reduced, thereby being capable of reducing an oil amount required for lubrication of the rotation shaft 200 and the pad 21. As a result, the amount of oil supply can be reduced, thereby being capable of also reducing the agitation loss. Thus, according to this embodiment, the bearing loss generated in the journal bearing 100 can be reduced.

Further, according to this embodiment, similarly to the first and second embodiments, the oil in the opening space 23 can be prevented from flowing back to the oil inlet port 23a with the backflow preventing portion 30. Thus, the oil in the opening space 23 can be efficiently supplied to the partially cylindrical surface 21a1 of the pad 21.

As described above, in the journal bearing 100 according to this embodiment, the cutout portion 24 or the cutout portion 25 that extends in the circumferential direction is formed at the axial end portion of the inner peripheral surface 21a.

According to this configuration, with the formation of the cutout portion 24 or the cutout portion 25, the oil film loss and the agitation loss can be reduced, thereby being capable of reducing the bearing loss generated in the journal bearing 100.

Sixth Embodiment

Figure 13:
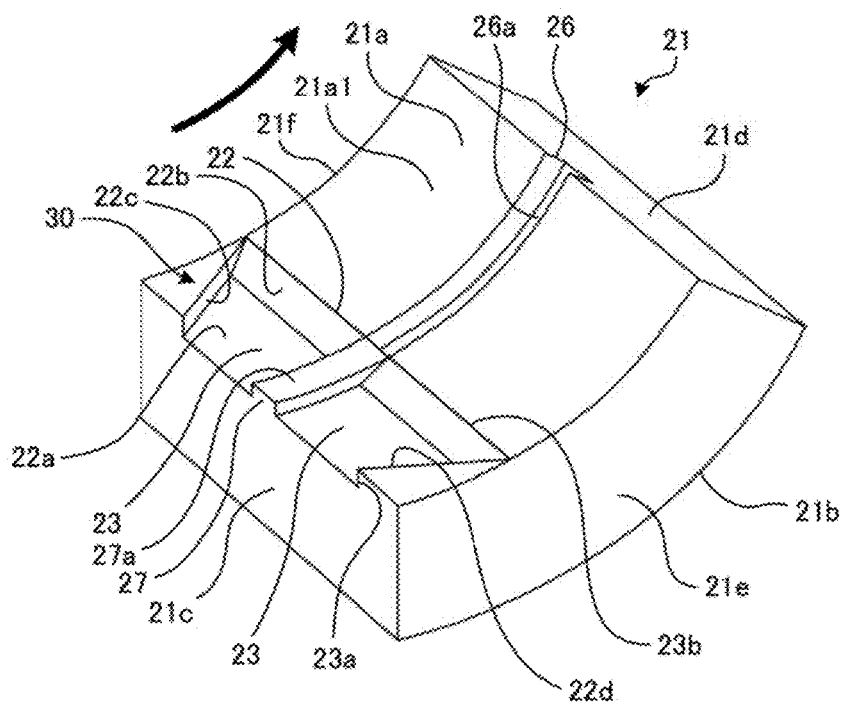
FIG. 13 is a perspective view for illustrating a configuration of a pad of a journal bearing according to a sixth embodiment.

A journal bearing according to a sixth embodiment is described. FIG. 13 is a perspective view for illustrating a configuration of a pad 21 of the journal bearing 100 according to this embodiment. This embodiment is different from the second embodiment in a configuration of the inner peripheral surface 21a of the pad 21. The point that the first side surface 22c and the second side surface 22d function as the backflow preventing portion 30 is the same as the second embodiment. Description of the same configurations as those of any of the first to fifth embodiments is omitted.

As illustrated in FIG. 13, a groove portion 26 is formed in an axial center portion of the inner peripheral surface 21a of the pad 21. The groove portion 26 is formed in a rectangular shape in a radial cross section of the pad 21, and extends along the circumferential direction. As viewed in a direction parallel to the axial direction, the groove portion 26 is formed in a range on the downstream side with respect to the recessed portion 22 and the opening space 23. A radial distance between a bottom surface 26a of the groove portion 26 and the outer peripheral surface 200b of the rotation shaft 200 is longer than a radial distance between the partially cylindrical surface 21a1 and the outer peripheral surface 200b.

A linear protruding portion 27 is formed at an axial center portion of the opening space 23. The protruding portion 27 is formed in a rectangular shape in the radial cross section of the pad 21, and extends along the circumferential direction. As viewed along the circumferential direction, the protruding portion 27 is formed to overlap the groove portion 26. As a result, an end portion of the groove portion 26 on the upstream side is closed by the protruding portion 27. A radial distance between an upper surface 27a of the protruding portion 27 and the outer peripheral surface 200b of the rotation shaft 200 is shorter than both of a radial distance between the first bottom surface 22a and the outer peripheral surface 200b and a radial distance between the second bottom surface 22b and the outer peripheral surface 200b. The upper surface 27a of the protruding portion 27 is a partially cylindrical surface arranged along the outer peripheral surface 200b.

In this embodiment, a radial distance between the bottom surface 26a of the groove portion 26 and the outer peripheral surface 200b of the rotation shaft 200 is longer than the radial distance between the partially cylindrical surface 21a1 and the outer peripheral surface 200b. Thus, a shear force that acts on the oil in the groove portion 26 is smaller than a shear force that acts on the oil in the partially cylindrical surface 21a1. When a radial distance between the bottom surface 26a and the outer peripheral surface 200b is sufficiently long, an oil film pressure in the groove portion 26 becomes substantially zero. In general, an oil film pressure between the pad 21 and the rotation shaft 200 becomes 0 at both axial end portions of the pad 21, and increases as a portion approaches an axial center portion of the pad 21. Thus, in this embodiment, the groove portion 26 is formed at the axial center portion of the pad 21 so that an oil film pressure at the axial center portion of the pad 21 is significantly reduced. As a result, in order that the oil film pressure required for supporting the rotation shaft 200 is obtained between the partially cylindrical surface 21a1 and the outer peripheral surface 200b, the thickness of the oil film formed between the partially cylindrical surface 21a1 and the outer peripheral surface 200b is smaller than that of the fifth embodiment. Thus, the amount of oil supply can be reduced, thereby being capable of reducing the agitation loss.

Here, when the rotation speed of the rotation shaft 200 is low, contact between the outer peripheral surface 200b of the rotation shaft 200 and the inner peripheral surface 21a of the pad 21 cannot be avoided. A contact surface pressure between the rotation shaft 200 and the pad 21 during low-speed rotation increases as the area ratio of the groove portion 26 in the inner peripheral surface 21a of the pad 21 increases. Thus, when the area ratio of the groove portion 26 in the inner peripheral surface 21a increases, frictional heat generation due to sliding between the rotation shaft 200 and the pad 21 increases, and seizure or abnormal wear may occur.

In contrast, in this embodiment, even when the area ratio of the groove portion 26 in the inner peripheral surface 21a is small, the amount of oil supply can be efficiently reduced, and the agitation loss can be reduced. That is, according to this embodiment, the agitation loss can be reduced while preventing occurrence of seizure or abnormal wear.

Further, the end portion of the groove portion 26 on the upstream side is closed by the protruding portion 27, thereby being capable of preventing the oil in the opening space 23 from being introduced to the groove portion 26 in which no oil film pressure is generated. Thus, according to this embodiment, the oil in the opening space 23 can be efficiently supplied to the partially cylindrical surface 21a1 in which an oil film pressure is generated.

Further, according to this embodiment, similarly to the first and second embodiments, the oil in the opening space 23 can be prevented from flowing back to the oil inlet port 23a with the backflow preventing portion 30. Thus, the oil in the opening space 23 can be efficiently supplied to the partially cylindrical surface 21a1 of the pad 21.

As described above, in the journal bearing 100 according to this embodiment, in the axial center portion of the inner peripheral surface 21a, the groove portion 26 that extends in the circumferential direction is formed on a downstream side of the recessed portion 22 in the rotating direction of the rotation shaft 200. The protruding portion 27 that closes the end portion of the groove portion 26 on the upstream side is formed on the recessed portion 22.

According to this configuration, with the formation of the groove portion 26, the agitation loss can be reduced while preventing occurrence of seizure or abnormal wear. Further, according to this configuration, the end portion of the groove portion 26 on the upstream side is closed by the protruding portion 27, thereby being capable of preventing the oil in the opening space 23 form being introduced to the groove portion 26 in which no oil film pressure is generated.

Seventh Embodiment

Figure 14:
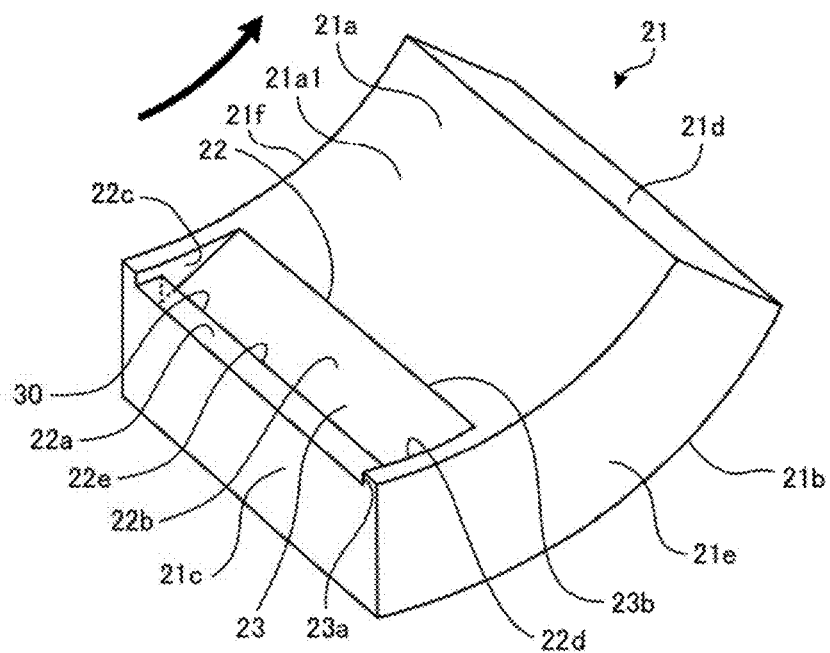
FIG. 14 is a perspective view for illustrating a configuration of a pad of a journal bearing according to a seventh embodiment.

A journal bearing according to a seventh embodiment is described. FIG. 14 is a perspective view for illustrating a configuration of a pad 21 of the journal bearing 100 according to this embodiment. Description of the same configurations as those of any of the first to sixth embodiments is omitted.

As illustrated in FIG. 14, the recessed portion 22 formed in the pad 21 in this embodiment includes the first bottom surface 22a, the second bottom surface 22b, and a third bottom surface 22e as a bottom surface that defines the outer peripheral side of the opening space 23. The second bottom surface 22b is arranged on the downstream side of the first bottom surface 22a. The third bottom surface 22e is arranged between the first bottom surface 22a and the second bottom surface 22b. The first bottom surface 22a, the third bottom surface 22e, and the second bottom surface 22b forming a bottom surface of the recessed portion 22 are arranged in the stated order toward the downstream side.

The second bottom surface 22b is inclined such that the radial distance between the second bottom surface 22b and the outer peripheral surface 200b of the rotation shaft 200 increases toward the upstream side. The first bottom surface 22a is formed along the outer peripheral surface 200b of the rotation shaft 200. The radial distance between the first bottom surface 22a and the outer peripheral surface 200b is shorter than a radial distance between the end portion of the second bottom surface 22b on the upstream side and the outer peripheral surface 200b. The third bottom surface 22e connects the end portion of the second bottom surface 22b on the upstream side and the end portion of the first bottom surface 22a on the downstream side to each other. The third bottom surface 22e is formed perpendicularly to the circumferential direction, and faces the downstream side, that is, the second bottom surface 22b side.

The bottom surface of the recessed portion 22 formed by the first bottom surface 22a, the third bottom surface 22e, and the second bottom surface 22b is formed in a stepped shape. As a result, in the bottom surface of the recessed portion 22, in a portion from at least the end portion of the second bottom surface 22b on the upstream side to the first bottom surface 22a, the radial distance between the bottom surface and the outer peripheral surface 200b decreases toward the upstream side in a stepwise manner. In this embodiment, at least the third bottom surface 22e in the bottom surface of the recessed portion 22 functions as the backflow preventing portion 30.

Figure 15:
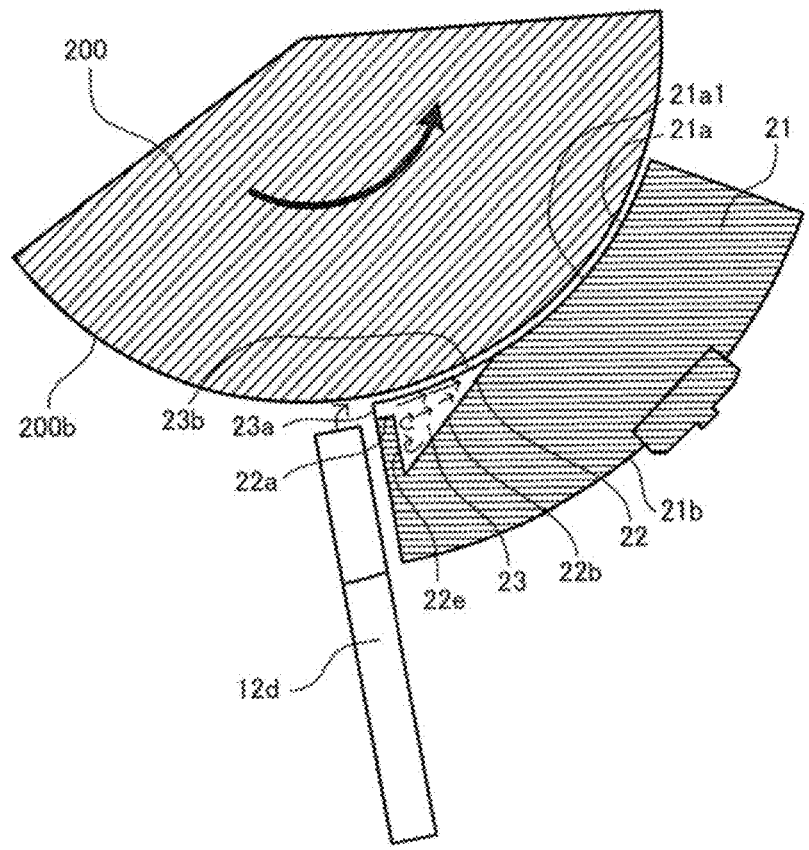
FIG. 15 is a sectional view for illustrating a partial configuration of the journal bearing according to the seventh embodiment.

Effects obtained by the configuration of this embodiment are described with reference to FIG. 15. FIG. 15 is a sectional view for illustrating a partial configuration of the journal bearing 100 according to this embodiment. FIG. 15 is an illustration of a cross section of the journal bearing 100 and the rotation shaft 200 taken along a plane perpendicular to the axial direction. In FIG. 15, an example of the flow of the oil is indicated by the arrows.

As illustrated in FIG. 15, in this embodiment, the oil that flows back to the upstream side along the second bottom surface 22b on the outer peripheral side of the opening space 23 is rebounded by the third bottom surface 22e that functions as the backflow preventing portion 30. The oil rebounded by the third bottom surface 22e merges with the oil that flows to the downstream side on the inner peripheral side of the opening space 23 and returns to the downstream side. The shear force that acts on the oil in the opening space 23 by the rotation shaft 200 is reduced as being farther from the outer peripheral surface 200b of the rotation shaft 200. Thus, the oil at a portion farther from the outer peripheral surface 200b in the opening space 23, that is, a portion along the second bottom surface 22b tends to flow back to the upstream side. In this embodiment, the backflow of the oil at the portion along the second bottom surface 22b is effectively prevented by the third bottom surface 22e. Thus, according to this embodiment, the effect of preventing the backflow of the oil in the opening space 23 is increased, thereby being capable of efficiently supplying the oil in the opening space 23 to the partially cylindrical surface 21a1 of the pad 21.

Further, similarly to the first and second embodiments, the opening space 23 of this embodiment has a shape that becomes narrower toward the upstream side. Thus, the backflow preventing portion 30 in this embodiment can prevent the backflow of the oil also with the action of the pressure loss.

As described above, in the journal bearing 100 according to this embodiment, the backflow preventing portion 30 includes the first bottom surface 22a, the third bottom surface 22e, and the second bottom surface 22b as a bottom surface that defines the outer peripheral side of the opening space 23. A radial distance between the bottom surface and the rotation shaft 200 decreases toward the upstream side in a stepwise manner.

According to this configuration, the backflow of the oil at the portion along the bottom surface in the opening space 23 can be effectively prevented, thereby being capable of efficiently supplying the oil in the opening space 23 to the partially cylindrical surface 21a1 of the pad 21.

Eighth Embodiment

Figure 16:
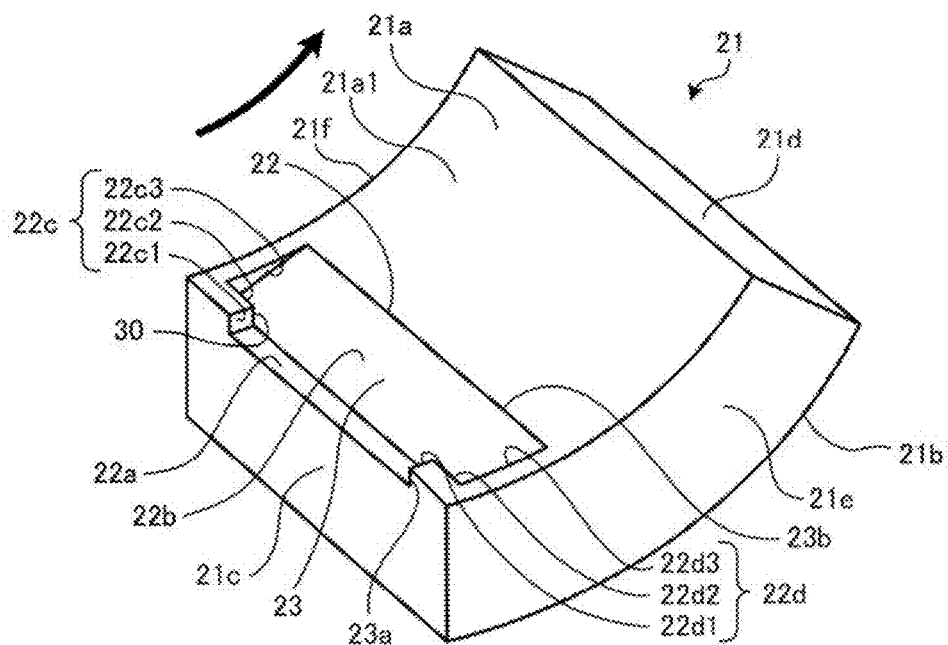
FIG. 16 is a perspective view for illustrating a configuration of a pad of a journal bearing according to an eighth embodiment.

A journal bearing according to an eighth embodiment is described. FIG. 16 is a perspective view for illustrating a configuration of a pad 21 of the journal bearing 100 according to this embodiment. Description of the same configurations as those of any of the first to seventh embodiments is omitted.

As illustrated in FIG. 16, the recessed portion 22 formed in the pad 21 in this embodiment includes a side surface 22c1, a side surface 22c2, and a side surface 22c3 as the first side surface 22c that defines one axial end side of the opening space 23. The side surface 22c3 is arranged on a downstream side of the side surface 22c1. The side surface 22c2 is arranged between the side surface 22c1 and the side surface 22c3.

Further, the recessed portion 22 includes a side surface 22d1, a side surface 22d2, and a side surface 22d3 as the second side surface 22d that defines the other axial end side of the opening space 23. The side surface 22d3 is arranged on a downstream side of the side surface 22d1. The side surface 22d2 is arranged between the side surface 22d1 and the side surface 22d3.

The side surface 22c1, the side surface 22c3, the side surface 22d1, and the side surface 22d3 are all formed perpendicularly to the axial direction. The side surface 22c1 and the side surface 22d1 are opposed to each other across the first bottom surface 22a. The side surface 22c3 and the side surface 22d3 are opposed to each other across the second bottom surface 22b. An axial distance between the side surface 22c1 and the side surface 22d1 is smaller than an axial distance between the side surface 22c3 and the side surface 22d3.

The side surface 22c2 connects an end portion of the side surface 22c1 on the downstream side and an end portion of the side surface 22c3 on the upstream side to each other. The side surface 22c2 is formed perpendicularly to the circumferential direction, and faces the downstream side.

The side surface 22d2 connects an end portion of the side surface 22d1 on the downstream side and an end portion of the side surface 22d3 on the upstream side to each other. The side surface 22d2 is formed perpendicularly to the circumferential direction, and faces the downstream side.

The first side surface 22c of the recessed portion 22 formed by the side surface 22c1, the side surface 22c2, and the side surface 22c3 is formed in a stepped shape. Further, the second side surface 22d of the recessed portion 22 formed by the side surface 22d1, the side surface 22d2, and the side surface 22d3 is formed in a stepped shape. As a result, the axial distance between the first side surface 22c and the second side surface 22d decreases toward the upstream side in a stepwise manner. In this embodiment, at least the side surface 22c2 in the first side surface 22c and at least the side surface 22d2 in the second side surface 22d function as the backflow preventing portion 30.

Figure 17:
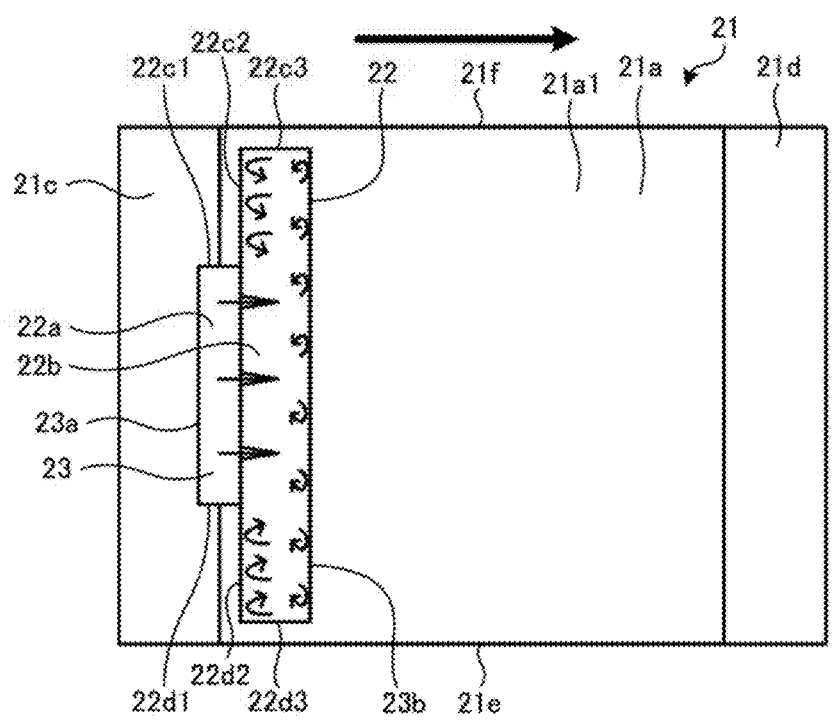
FIG. 17 is a top view for illustrating a configuration of the pad of the journal bearing according to the eighth embodiment as viewed from the inner peripheral side.

Effects obtained by the configuration of this embodiment are described with reference to FIG. 17. FIG. 17 is a top view for illustrating a configuration of the pad 21 of the journal bearing 100 according to this embodiment as viewed from the inner peripheral side. An up-and-down direction in FIG. 17 represents the axial direction. In FIG. 17, an example of the flow of the oil is indicated by the arrows.

As illustrated in FIG. 17, in this embodiment, the oil that flows back along the side surface 22c3 on the one axial end side of the opening space 23 is rebounded by the side surface 22c2 that functions as the backflow preventing portion 30. Further, the oil that flows back along the side surface 22d3 on the other axial end side of the opening space 23 is rebounded by the side surface 22d2 that functions as the backflow preventing portion 30. In the journal bearing 100, the supplied oil is often discharged to an outer side of the carrier ring 10 in the axial direction, and hence the oil is liable to be insufficient as the portion is farther from the axial center portion of the pad 21. In this embodiment, the backflow of the oil at the portions farther from the axial center portion of the pad 21 in the opening space 23, that is, both axial end portions of the opening space 23 is effectively prevented by the side surface 22c2 and the side surface 22d2. Thus, according to this embodiment, the oil can be efficiently supplied to both axial end portions at which the oil is liable to be insufficient on the partially cylindrical surface 21a1 of the pad 21.

Further, similarly to the first and second embodiments, the opening space 23 of this embodiment has a shape that becomes narrower toward the upstream side. Thus, the backflow preventing portion 30 in this embodiment can prevent the backflow of the oil also with the action of the pressure loss.

As described above, in the journal bearing 100 according to this embodiment, the backflow preventing portion 30 includes the first side surface 22c that defines the one axial end side of the opening space 23, and the second side surface 22d that defines the other axial end side of the opening space 23. The axial distance between the first side surface 22c and the second side surface 22d decreases toward the upstream side in a stepwise manner.

According to this configuration, the backflow of the oil at both axial end portions of the opening space 23 can be effectively prevented, thereby being capable of efficiently supplying the oil to both axial end portions at which the oil is liable to be insufficient on the partially cylindrical surface 21a1 of the pad 21.

Ninth Embodiment

Figure 18:
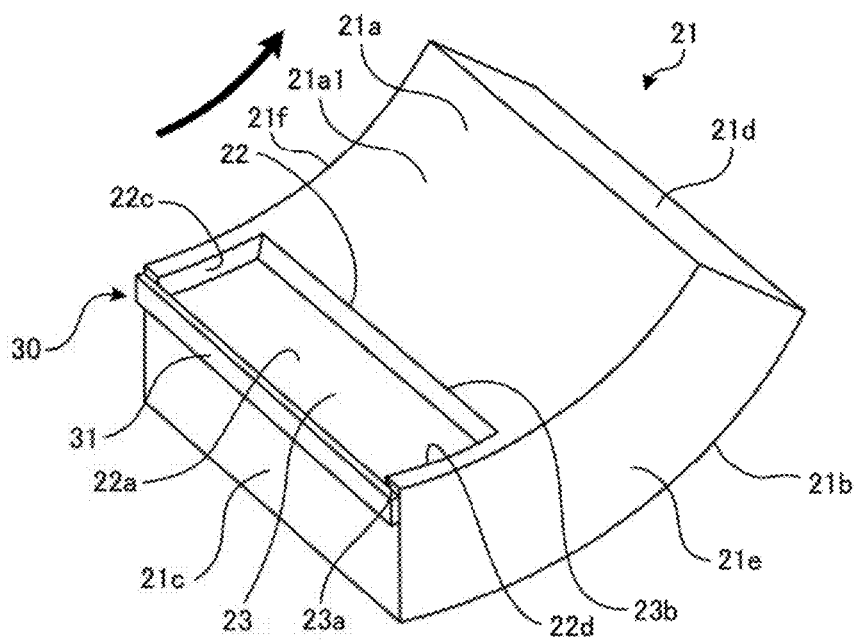
FIG. 18 is a perspective view for illustrating a configuration of a pad of a journal bearing according to a ninth embodiment.

A journal bearing according to a ninth embodiment is described. FIG. 18 is a perspective view for illustrating a configuration of a pad 21 of the journal bearing 100 according to this embodiment. Description of the same configurations as those of any of the first to eighth embodiments is omitted.

As illustrated in FIG. 18, in this embodiment, a backflow preventing member 31 separate from the pad 21 is mounted to the pad 21 as the backflow preventing portion 30 in a fixed manner. The backflow preventing member 31 has, for example, a rectangular flat plate shape elongated in one direction. The backflow preventing member 31 is mounted on the upstream end surface 21c of the pad 21 so as to cover a part of the oil inlet port 23a, for example, an outer peripheral portion in the oil inlet port 23a.

Figure 19:
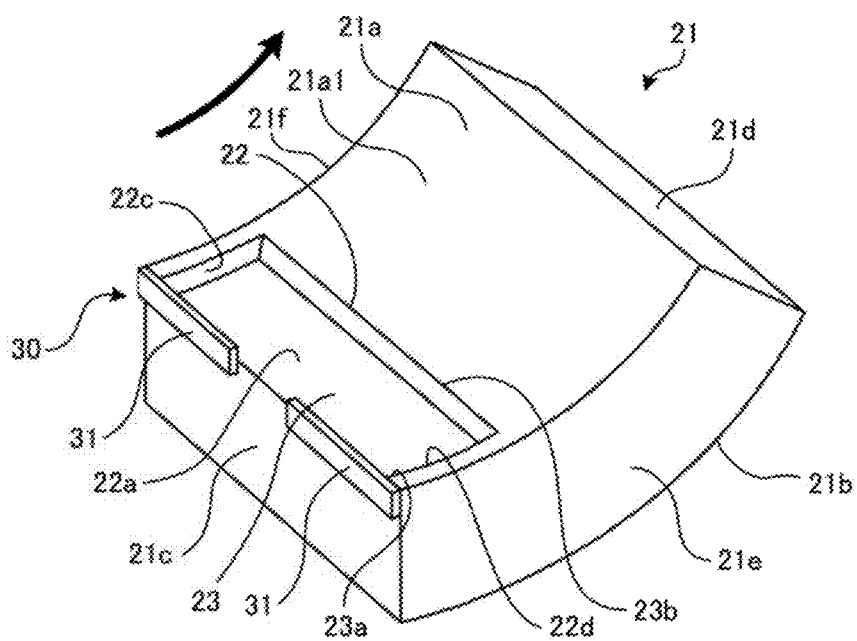
FIG. 19 is a perspective view for illustrating a modification example of the configuration of the pad of the journal bearing according to the ninth embodiment.

FIG. 19 is a perspective view for illustrating a modification example of the configuration of the pad 21 of the journal bearing 100 according to this embodiment. As illustrated in FIG. 19, the backflow preventing member 31 in this modification example is mounted on the upstream end surface 21c of the pad 21 so as to cover both axial end portions of the oil inlet port 23a.

The backflow preventing portion 30 in the above-mentioned first to eighth embodiments is a part of components of the pad 21. In contrast, the backflow preventing member 31 in this embodiment is a component separate from the pad 21. Thus, the backflow preventing member 31 can be mounted after the pad 21 is manufactured. Accordingly, the degree of freedom in shape and size of the opening space 23 formed in the pad 21 can be increased. For example, in the configurations of the seventh and eighth embodiments, the volume of the opening space 23 may be reduced due to provision of the backflow preventing portion 30. In contrast, in this embodiment, the backflow preventing member 31 is mounted so as to cover a part of the oil inlet port 23a from the upstream side, thereby being capable of securing the large volume of the opening space 23. Thus, according to this embodiment, a larger amount of the oil can be stored in the opening space 23.

Further, according to this embodiment, the effects similar to those of the seventh or eighth embodiment are obtained.

As described above, in the journal bearing 100 according to this embodiment, the backflow preventing portion 30 includes the backflow preventing member 31 separate from the pad 21. The backflow preventing member 31 is mounted to the pad 21 so as to cover a part of the oil inlet port 23a.

According to this configuration, the degree of freedom in shape and size of the opening space 23 formed in the pad 21 can be increased.

Tenth Embodiment

Figure 20:
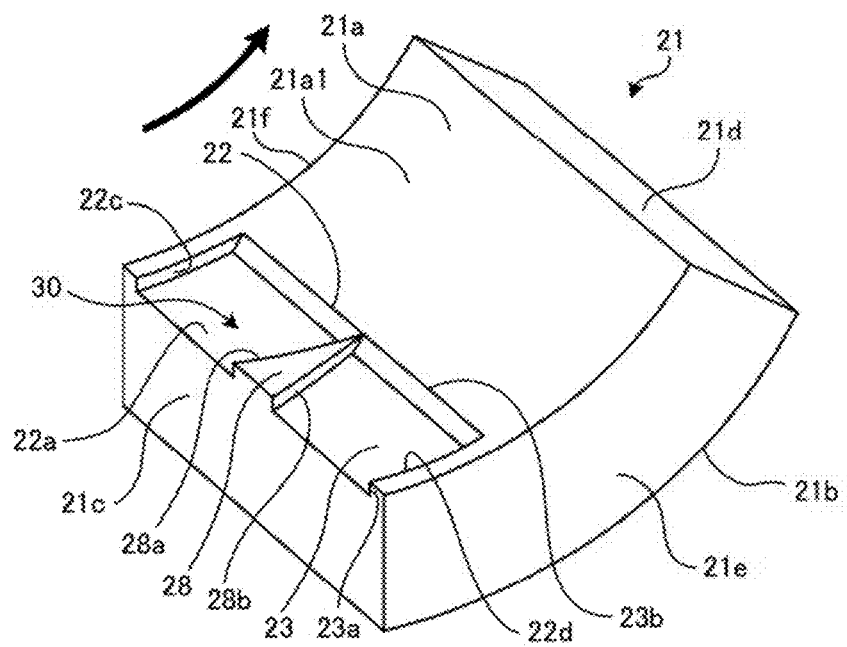
FIG. 20 is a perspective view for illustrating a configuration of a pad of a journal bearing according to a tenth embodiment.

A journal bearing according to a tenth embodiment is described. FIG. 20 is a perspective view for illustrating a configuration of a pad 21 of the journal bearing 100 according to this embodiment. Description of the same configurations as those of any of the first to ninth embodiments is omitted.

As illustrated in FIG. 20, a division wall 28 that divides the opening space 23 in the axial direction is formed at an axial center portion of the recessed portion 22. The division wall 28 includes a first wall surface 28a and a second wall surface 28b. The first wall surface 28a is opposed to the first side surface 22c. The second wall surface 28b is opposed to the second side surface 22d. An axial dimension between the first wall surface 28a and the second wall surface 28b, that is, a width of the division wall 28 increases toward the upstream side. As a result, an axial distance between the first side surface 22c and the first wall surface 28a decreases toward the upstream side. Further, an axial distance between the second side surface 22d and the second wall surface 28b decreases toward the upstream side. In this embodiment, at least the division wall 28 functions as the backflow preventing portion 30.

The flow velocity of the oil is reduced as a portion is closer to a fixing wall surface, and becomes 0 at a wall surface boundary. In this embodiment, the division wall 28 is formed at the axial center portion of the opening space 23. Thus, a distance between the first side surface 22c and the first wall surface 28a and a distance between the second side surface 22d and the second wall surface 28b are both shorter than a distance between the first side surface 22c and the second side surface 22d. Thus, in this embodiment, the action of the pressure loss generated in the oil that flows back in the opening space 23 is larger than that in the second embodiment. Thus, according to this embodiment, the oil in the opening space 23 can be further reliably prevented from flowing back to the oil inlet port 23a. Accordingly, according to this embodiment, the oil in the opening space 23 can be further efficiently supplied to the partially cylindrical surface 21a1 of the pad 21.

As described above, in the journal bearing 100 according to this embodiment, the backflow preventing portion 30 includes the division wall 28 that divides the opening space 23 in the axial direction. The division wall 28 includes the first wall surface 28a opposed to the first side surface 22c, and the second wall surface 28b opposed to the second side surface 22d. The axial distance between the first side surface 22c and the first wall surface 28a and the axial distance between the second side surface 22d and the second wall surface 28b decrease toward the upstream side.

According to this configuration, the sectional area of each of the two opening spaces 23 divided by the division wall 28 decreases toward the upstream side. Thus, a high pressure loss is generated in the oil that flows back in each of the opening spaces 23, and the flow rate of the backflow oil is reduced. Further, in this configuration, the distance between the first side surface 22c and the first wall surface 28a and the distance between the second side surface 22d and the second wall surface 28b are both shorter than the distance between the first side surface 22c and the second side surface 22d. Thus, the action of the pressure loss generated in the oil that flows back in each of the opening space 23 becomes larger. Thus, the oil in each of the opening space 23 can be further reliably prevented from flowing back to the oil inlet port 23a. Accordingly, the oil in each of the opening space 23 can be further efficiently supplied to the partially cylindrical surface 21a1 of the pad 21.

Eleventh Embodiment

Figure 21:
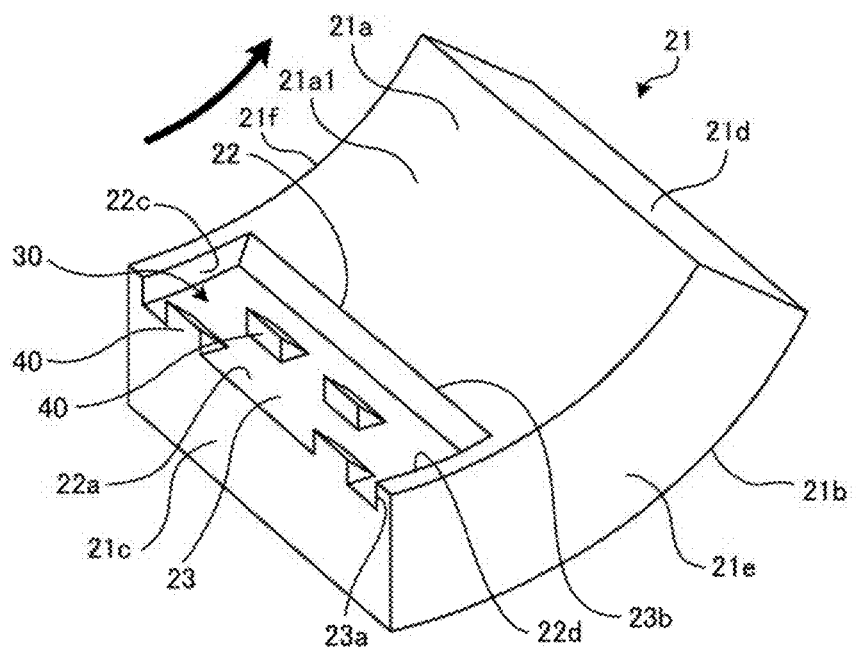
FIG. 21 is a perspective view for illustrating a configuration of a pad of a journal bearing according to an eleventh embodiment.

A journal bearing according to an eleventh embodiment is described. FIG. 21 is a perspective view for illustrating a configuration of a pad 21 of the journal bearing 100 according to this embodiment. Description of the same configurations as those of any of the first to tenth embodiments is omitted.

As illustrated in FIG. 21, four protrusions 40 protruding from the first bottom surface 22a in the radial direction are formed on the first bottom surface 22a of the recessed portion 22. Each of the protrusions 40 functions as the backflow preventing portion 30. A radial height of each of the protrusions 40 from the first bottom surface 22a increases toward the upstream side. As a result, the opening space 23 has a shape that becomes narrower toward the upstream side in a region in which the protrusions 40 are formed. The number of the protrusions 40 is not limited to four, and may be one or more and three or less, or five or more.

Figure 22:
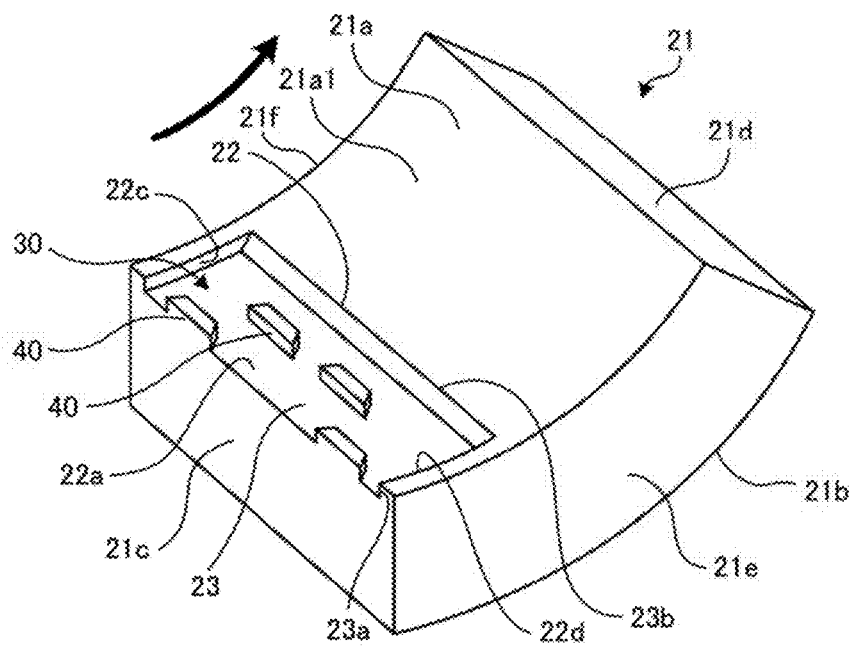
FIG. 22 is a perspective view for illustrating a modification example of the configuration of the pad of the journal bearing according to the eleventh embodiment.

FIG. 22 is a perspective view for illustrating a modification example of the configuration of the pad 21 of the journal bearing 100 according to this embodiment. As illustrated in FIG. 22, four protrusions 40 protruding from the first bottom surface 22a in the radial direction are formed on the first bottom surface 22a of the recessed portion 22. In this modification example, an axial width of each of the protrusions 40 increases toward the upstream side. As a result, the opening space 23 has a shape that becomes narrower toward the upstream side in a region between two protrusions 40 adjacent to each other in the axial direction, a region between the first side surface 22c and the protrusion 40, or a region between the second side surface 22d and the protrusion 40.

In this embodiment, the effect of preventing the backflow of the oil with the action of the pressure loss is obtained at each portion of the opening space 23. Thus, the backflow of the oil in the opening space 23 is evenly prevented. Thus, the oil in the opening space 23 can be uniformly supplied to the partially cylindrical surface 21a1 of the pad 21.

As described above, in the journal bearing 100 according to this embodiment, the backflow preventing portion 30 includes the protrusions 40 formed on the recessed portion 22. A radial height of each of the protrusions 40 increases toward the upstream side. Alternatively, an axial width of each of the protrusions 40 increases toward the upstream side.

According to this configuration, the oil backflow prevention effect with the action of the pressure loss is obtained at each portion of the opening space 23, thereby being capable of uniformly supplying the oil in the opening space 23 to the partially cylindrical surface 21a1 of the pad 21.

Twelfth Embodiment

Figure 23:
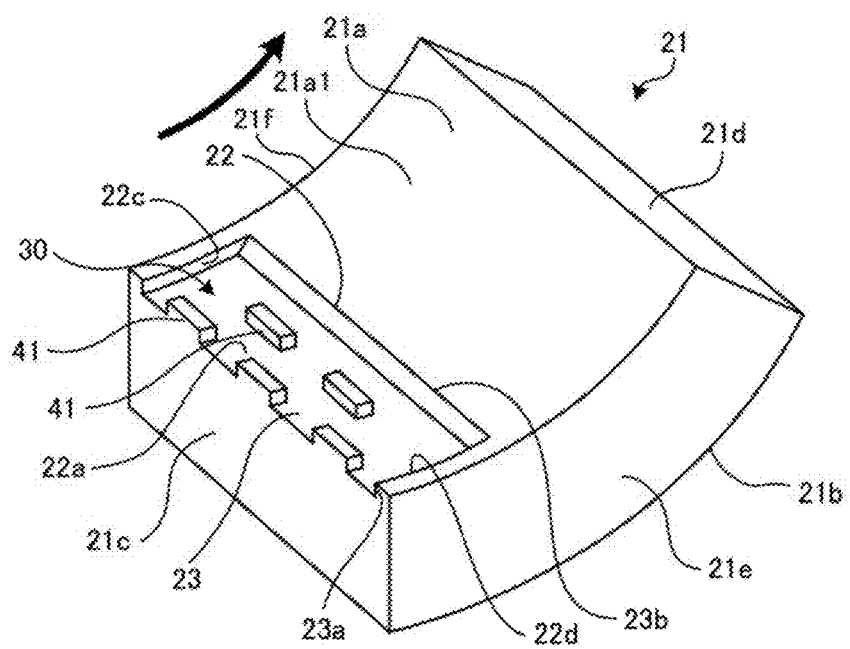
FIG. 23 is a perspective view for illustrating a configuration of a pad of a journal bearing according to a twelfth embodiment.

A journal bearing according to a twelfth embodiment is described. FIG. 23 is a perspective view for illustrating a configuration of a pad 21 of the journal bearing 100 according to this embodiment. Description of the same configurations as those of any of the first to eleventh embodiments is omitted.

As illustrated in FIG. 23, a plurality of protrusions 41 protruding from the first bottom surface 22a in the radial direction are formed on the first bottom surface 22a of the recessed portion 22. The plurality of protrusions 41 function as the backflow preventing portion 30. Some of the plurality of protrusions 41 are arranged in the axial direction. The number of the protrusions 41 arranged in the axial direction increases toward the upstream side.

The arrangement of the plurality of protrusions 41 may also be expressed using the number of the protrusions 41 per unit area, that is, the arrangement density of the protrusions 41. In this embodiment, the arrangement density of the protrusions 41 in the recessed portion 22 increases toward the upstream side.

Each of the protrusions 41 may have a radial height of several μm orders. For example, the first bottom surface 22a processed such that the surface roughness increases toward the upstream side is also included in this embodiment.

According to this embodiment, the arrangement density of the protrusions 41 increases toward the upstream side, and hence the oil backflow prevention effect with the action of the pressure loss or the oil backflow prevention effect by the rebound at the wall surface of each of the protrusions 41 increase toward the upstream side of the opening space 23. Thus, the oil in the opening space 23 can be prevented from flowing back to the oil inlet port 23a, thereby being capable of efficiently supplying the oil in the opening space 23 to the partially cylindrical surface 21a1 of the pad 21.

As described above, in the journal bearing 100 according to this embodiment, the backflow preventing portion 30 includes the plurality of protrusions 41 formed on the recessed portion 22. The arrangement density of the plurality of each of the protrusions 41 increases toward the upstream side.

According to this embodiment, the oil backflow prevention effect with the action of the pressure loss or the oil backflow prevention effect by the rebound at the wall surface of each of the protrusions 41 increase toward the upstream side of the opening space 23. Thus, the oil in the opening space 23 can be prevented from flowing back to the oil inlet port 23a, thereby being capable of efficiently supplying the oil in the opening space 23 to the partially cylindrical surface 21a1 of the pad 21.

Thirteenth Embodiment

Figure 24:
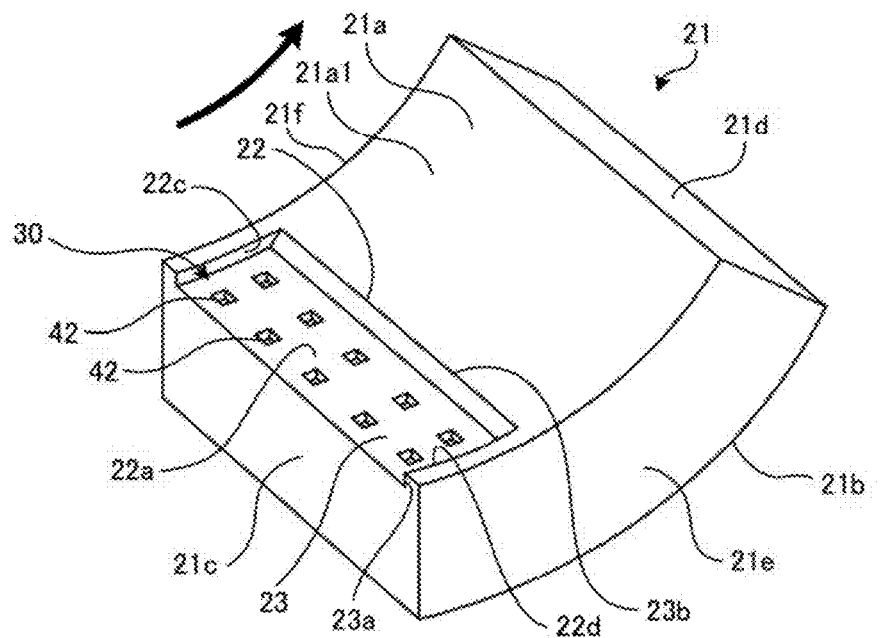
FIG. 24 is a perspective view for illustrating a configuration of a pad of a journal bearing according to a thirteenth embodiment.

A journal bearing according to a thirteenth embodiment is described. FIG. 24 is a perspective view for illustrating a configuration of a pad 21 of the journal bearing 100 according to this embodiment. Description of the same configurations as those of any of the first to twelfth embodiments is omitted.

As illustrated in FIG. 24, a plurality of recesses 42 are formed in the first bottom surface 22a of the recessed portion 22. Each of the recesses 42 is recessed partially so as to have a recessed shape with respect to the first bottom surface 22a, and has a rectangular planar shape. Each of the recesses 42 functions as the backflow preventing portion 30. A radial distance between the bottom surface of each of the recesses 42 and the outer peripheral surface 200b of the rotation shaft 200 is longer than the radial distance between the first bottom surface 22a and the outer peripheral surface 200b. The plurality of recesses 42 are arranged in, for example, a lattice pattern.

In this embodiment, the flow of the oil in the opening space 23 is likely to be disturbed in each of the recesses 42. As a result, the flow of the oil that flows back toward the oil inlet port 23a in the opening space 23 can be shifted from a laminar flow to a turbulent flow, thereby being capable of reducing the flow velocity of the backflow oil. Thus, the oil in the opening space 23 can be prevented from flowing back to the oil inlet port 23a, thereby being capable of efficiently supplying the oil in the opening space 23 to the partially cylindrical surface 21a1 of the pad 21.

As described above, in the journal bearing 100 according to this embodiment, the backflow preventing portion 30 includes the recesses 42 formed in the recessed portion 22.

According to this embodiment, the flow of the oil that flows back toward the oil inlet port 23a in the opening space 23 can be shifted from a laminar flow to a turbulent flow, thereby being capable of reducing the flow velocity of the backflow oil. Thus, the oil in the opening space 23 can be prevented from flowing back to the oil inlet port 23a, thereby being capable of efficiently supplying the oil in the opening space 23 to the partially cylindrical surface 21a1 of the pad 21.

Fourteenth Embodiment

Figure 25:
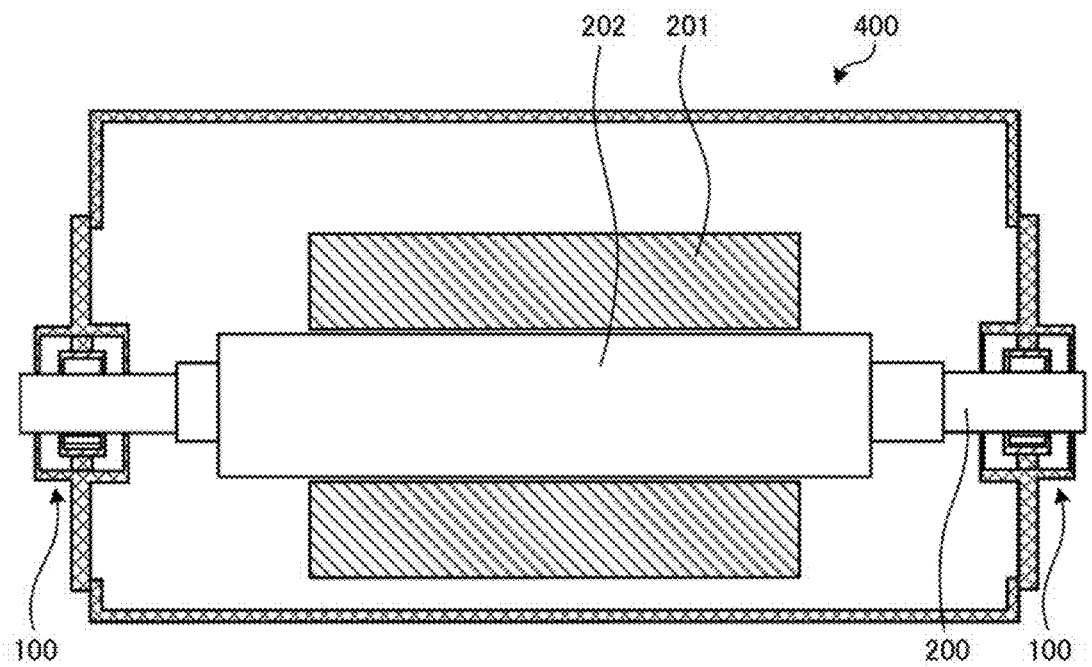
FIG. 25 is a sectional view for illustrating a configuration of a rotating machine according to a fourteenth embodiment taken along an axial direction.

A rotating machine according to a fourteenth embodiment is described. FIG. 25 is a sectional view for illustrating a configuration of a rotating machine 400 according to this embodiment taken along the axial direction. An up-and-down direction in FIG. 25 represents, for example, a vertical up-and-down direction. As illustrated in FIG. 25, the rotating machine 400 includes the rotation shaft 200 installed horizontally, a pair of journal bearings 100 configured to rotatably support both end portions of the rotation shaft 200, and a stator 201 installed on an outer peripheral side of the rotation shaft 200. At least one of the pair of journal bearings 100 is the journal bearing according to any one of the first to thirteenth embodiments.

Each of the journal bearings 100 is installed on an outer peripheral side of the end portion of the rotation shaft 200. Each of the journal bearings 100 is configured to support the radial load of the rotation shaft 200 including the own weight of the rotation shaft 200. The rotation shaft 200 includes a rotator 202 in which a magnetic pole is formed. In this embodiment, a rotating electric machine that generates heat by inducing an AC voltage to the stator 201 is exemplified as the rotating machine 400.

According to this embodiment, the bearing loss generated in the journal bearing 100 with respect to energy of the rotation shaft 200 can be reduced, thereby being capable of improving the power generation efficiency of the rotating electric machine. Further, the amount of oil supply to the journal bearing 100 can be reduced, thereby being capable of reducing the size of an oil supply facility such as an oil supply pump.

Further, the embodiments described above and the modification examples may be carried out in various combinations.

In the above-mentioned first embodiment, the journal bearing 100 including the two pads 20 and 21 and the five oil supply nozzles 12a, 12b, 12c, 12d, and 12e is described as an example. However, the number of pads may be one or three or more, and the number of oil supply nozzles may be one or more and four or less or six or more. Further, the arrangement positions of the pads and the oil supply nozzles are not limited to the arrangement positions illustrated in FIG. 2.

In the journal bearing 100 according to any one of the above-mentioned first to thirteenth embodiments, the pads 20 and 21 may each have a single-layer structure made of a single material or a multilayer structure made of a plurality of materials. Various materials such as metal and resin may be used as the material forming the pads 20 and 21.

In the journal bearing 100 according to any one of the above-mentioned first to thirteenth embodiments, the pads 20 and 21 may each have a constant axial width over the entire circumferential direction or an axial width that varies depending on the position in the circumferential direction.

In the journal bearing 100 according to the above-mentioned first embodiment, in FIG. 1 and FIG. 2, the state in which the oil 13 is supplied to the inside is illustrated, but the journal bearing 100 also includes a state in which the oil 13 is not supplied to the inside.

In the specification of the present application, expressions representing the directions such as "axial direction", "radial direction", "circumferential direction", "rotating direction", and "perpendicular" do not strictly include only such directions, but also include directions in which substantially the same function is obtained.

In the specification of the present application, expressions representing the length or the change in number such as "increases toward the upstream side" are not limited to a state of monotonically increasing, and includes a state of increasing only in a certain partial range, a state in which the increase rate differs for each range, and a state of increasing in a stepwise manner. The same applies also to expressions such as "decreases toward the upstream side".

In the specification of the present application, expressions such as "comprising", "providing", "including", and "having" are not exclusive expressions that exclude the presence of other components.

REFERENCE SIGNS LIST 10 carrier ring, 11 guide metal, 12a, 12b, 12c, 12d, 12e oil supply nozzle, 13 oil, 20, 21 pad, 21a inner peripheral surface, 21a1 partially cylindrical surface, 21b outer peripheral surface, 21c upstream end surface, 21d downstream end surface, 21e, 21f side end surface, 22 recessed portion, 22a first bottom surface, 22b second bottom surface, 22c first side surface, 22c1, 22c2, 22c3 side surface, 22d second side surface, 22d1, 22d2, 22d3 side surface, 22e third bottom surface, 23 opening space, 23a oil inlet port, 23b oil outlet port, 24 cutout portion, 24a bottom surface, 25 cutout portion, 25a bottom surface, 26 groove portion, 26a bottom surface, 27 protruding portion, 27a upper surface, 28 division wall, 28a first wall surface, 28b second wall surface, 30 backflow preventing portion, 31 backflow preventing member, 40, 41 protrusion, 42 recess, 100 journal bearing, 200 rotation shaft, 200a axial center, 200b outer peripheral surface, 201 stator, 202 rotator, 300 pad, 301 inner peripheral surface, 302 recessed portion, 303 opening space, 304 bottom surface, 305 gap, 306 wall surface, 307 oil inlet port, 400 rotating machine

The invention claimed is:

1. A journal bearing, comprising:
a carrier ring to be arranged on an outer peripheral side of a rotation shaft;
a pad to be swingably arranged on the outer peripheral side of the rotation shaft and an inner peripheral side of the carrier ring; and
an oil supply nozzle configured to supply oil to a portion between the rotation shaft and the pad,
wherein the pad includes:
an inner peripheral surface opposed to the rotation shaft;
an outer peripheral surface opposed to the carrier ring via a gap; and
an upstream end surface which is formed on an upstream side of the inner peripheral surface in a rotating direction of the rotation shaft, and connects the inner peripheral surface and the outer peripheral surface to each other,
wherein the inner peripheral surface includes:
a partially cylindrical surface; and
a recessed portion which is arranged on an upstream side of the partially cylindrical surface, and forms an opening space for storing the oil,
wherein the opening space includes:
an oil inlet port which is opened at the upstream end surface, and is configured to introduce the oil to the opening space; and
an oil outlet port opened so as to be opposed to the rotation shaft,
wherein the pad includes a backflow prevention portion configured to prevent the oil in the opening space from flowing back to the oil inlet port,
wherein the oil supply nozzle is arranged to be adjacent to the pad in a circumferential direction,
wherein the backflow preventing portion includes a bottom surface that defines an outer peripheral side of the opening space, and
wherein a radial distance between the bottom surface and the rotation shaft decreases toward the upstream side.

2. The journal bearing according to claim 1, wherein the radial distance between the bottom surface and the rotation shaft decreases toward the upstream side in a stepwise manner.

3. The journal bearing according to claim 1,
wherein the recessed portion includes:
a first side surface that defines one axial end side of the opening space; and
a second side surface that defines another axial end side of the opening space,
wherein the backflow preventing portion includes a division wall that divides the opening space in an axial direction,
wherein the division wall includes:
a first wall surface opposed to the first side surface; and
a second wall surface opposed to the second side surface, and
wherein an axial distance between the first side surface and the first wall surface and an axial distance between the second side surface and the second wall surface decrease toward the upstream side.

4. The journal bearing according to claim 1,
wherein the backflow preventing portion includes a protrusion formed on the recessed portion, and
wherein a radial height of the protrusion increases toward the upstream side.

5. The journal bearing according to claim 1,
wherein the backflow preventing portion includes a protrusion formed on the recessed portion, and
wherein an axial width of the protrusion increases toward the upstream side.

6. The journal bearing according to claim 1,
wherein the backflow preventing portion includes a plurality of protrusions formed on the recessed portion, and
wherein an arrangement density of the plurality of protrusions increases toward the upstream side.

7. The journal bearing according to claim 1, wherein the backflow preventing portion includes a recess formed in the recessed portion.

8. The journal bearing according to claim 1, wherein a cutout portion that extends in the circumferential direction is formed at an axial end portion of the inner peripheral surface.

9. The journal bearing according to claim 1,
wherein, in an axial center portion of the inner peripheral surface, a groove portion that extends in the circumferential direction is formed on a downstream side of the recessed portion in the rotating direction of the rotation shaft, and wherein a protruding portion that closes an end portion of the groove portion on the upstream side is formed on the recessed portion.

10. A rotating machine, comprising:
the journal bearing of claim 1; and
the rotation shaft.

11. A journal bearing, comprising:
a carrier ring to be arranged on an outer peripheral side of a rotation shaft;
a pad to be swingably arranged on the outer peripheral side of the rotation shaft and an inner peripheral side of the carrier ring; and
an oil supply nozzle configured to supply oil to a portion between the rotation shaft and the pad,
wherein the pad includes:
an inner peripheral surface opposed to the rotation shaft,
an outer peripheral surface opposed to the carrier ring via a gap; and
an upstream end surface which is formed on an upstream side of the inner peripheral surface in a rotating direction of the rotation shaft, and connects the inner peripheral surface and the outer peripheral surface to each other,
wherein the inner peripheral surface includes:
a partially cylindrical surface; and
a recessed portion which is arranged on an upstream side of the partially cylindrical surface, and forms an opening space for storing the oil,
wherein the opening space includes:
an oil inlet port which is opened at the upstream end surface, and is configured to introduce the oil to the opening space; and
an oil outlet port opened so as to be opposed to the rotation shaft,
wherein the pad includes a backflow prevention portion configured to prevent the oil in the opening space from flowing back to the oil inlet port,
wherein the opening space includes two axial end sides, and the backflow preventing portion includes:
a first side surface that defines a first one of the two axial end sides of the opening space; and
a second side surface that defines a second one of the two axial end sides of the opening space, and
wherein an axial distance between the first side surface and the second side surface decreases toward the upstream side.

12. The journal bearing according to claim 11, wherein the axial distance between the first side surface and the second side surface decreases toward the upstream side in a stepwise manner.

13. The journal bearing according to claim 11, wherein a maximum value of the axial distance between the first side surface and the second side surface is equal to an axial dimension of the partially cylindrical surface.

14. The journal bearing according to claim 11,
wherein the recessed portion includes a bottom surface that defines an outer peripheral side of the opening space,
wherein a radial distance between the bottom surface and the rotation shaft increases toward the upstream side, and
wherein an end portion of the bottom surface on the upstream side is connected to an end portion of the outer peripheral surface on the upstream side.

15. A journal bearing, comprising:
a carrier ring to be arranged on an outer peripheral side of a rotation shaft;
a pad to be swingably arranged on the outer peripheral side of the rotation shaft and an inner peripheral side of the carrier ring; and
an oil supply nozzle configured to supply oil to a portion between the rotation shaft and the pad,
wherein the pad includes:
an inner peripheral surface opposed to the rotation shaft;
an outer peripheral surface opposed to the carrier ring via a gap; and
an upstream end surface which is formed on an upstream side of the inner peripheral surface in a rotating direction of the rotation shaft, and connects the inner peripheral surface and the outer peripheral surface to each other,
wherein the inner peripheral surface includes:
a partially cylindrical surface; and
a recessed portion which is arranged on an upstream side of the partially cylindrical surface, and forms an opening space for storing the oil,
wherein the opening space includes:
an oil inlet port which is opened at the upstream end surface, and is configured to introduce the oil to the opening space; and
an oil outlet port opened so as to be opposed to the rotation shaft,
wherein the pad includes a backflow prevention portion configured to prevent the oil in the opening space from flowing back to the oil inlet port,
wherein the backflow preventing portion includes a backflow preventing member separate from the pad, and
wherein the backflow preventing member is mounted to the pad so as to cover a part of the oil inlet port.

* * * * *